US007787480B1

(12) United States Patent
Mehta et al.

(10) Patent No.: US 7,787,480 B1
(45) Date of Patent: Aug. 31, 2010

(54) ROUTING FRAMES IN A TRILL NETWORK USING SERVICE VLAN IDENTIFIERS

(75) Inventors: Apurva Mehta, Cupertino, CA (US); Ramasamy Ramanathan, Santa Clara, CA (US); Kumar Mehta, Cupertino, CA (US); Sunesh Rustagi, Cupertino, CA (US); Sanjiv Doshi, San Jose, CA (US); Shiva Shenoy, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 7 days.

(21) Appl. No.: 12/397,811

(22) Filed: Mar. 4, 2009

(51) Int. Cl.
*H04L 12/56* (2006.01)
(52) U.S. Cl. .................................. 370/401; 370/419
(58) Field of Classification Search ................ 370/401, 370/235, 392, 395, 256, 419, 254
See application file for complete search history.

(56) References Cited

U.S. PATENT DOCUMENTS

| 6,658,012 | B1 * | 12/2003 | Baucom et al. ............. 370/401 |
| 7,483,374 | B2 * | 1/2009 | Nilakantan et al. .......... 370/235 |
| 7,606,229 | B1 * | 10/2009 | Foschiano et al. ........... 370/392 |
| 7,697,556 | B2 * | 4/2010 | Gray .......................... 370/419 |
| 2009/0073988 | A1 * | 3/2009 | Ghodrat et al. ........ 370/395.53 |
| 2009/0161584 | A1 * | 6/2009 | Guan .......................... 370/256 |
| 2009/0175274 | A1 * | 7/2009 | Aggarwal et al. ........... 370/390 |
| 2010/0061269 | A1 * | 3/2010 | Banerjee et al. ............. 370/254 |

FOREIGN PATENT DOCUMENTS

| EP | 1 858 212 | 11/2007 |
| EP | 2 001 172 | 12/2008 |

| WO | WO2008/076052 | 6/2008 |

OTHER PUBLICATIONS

Minimizing ARP Broadcasting in TRILL, 2009 IEEE.*
Interworking Task Group Of IEEE, "IEEE P802.1ah/D4.2—Virtual Bridged Local Area Networks—Amendment 6: Provider Backbone Bridges", Mar. 26, 2008.
IEEE Computer Society, "IEEE Std. 802.1D—2004; IEEE Standard for Local and metropolitan area networks Media Access Control (MAC) Bridges", Jun. 9, 2004.

(Continued)

*Primary Examiner*—Thong H Vu
(74) *Attorney, Agent, or Firm*—Sanford E. Warren, Jr.; Akin Gump Strauss Hauer & Feld

(57) ABSTRACT

Methods, apparatus, and products are disclosed for routing frames in a TRILL network using service VLAN identifiers by: receiving a frame from an ingress bridge node for transmission through the TRILL network to a destination node that connects to the TRILL network through an egress node, the received frame including a customer VLAN identifier, a service VLAN identifier uniquely assigned to the ingress bridge node, and a destination node address for the destination node, the received frame not having mac-in-mac encapsulation; adding, in dependence upon the service VLAN identifier and the destination node address, a TRILL header conforming to the TRILL protocol, the TRILL header including an ingress bridge nickname and an egress bridge nickname; and routing, to the egress bridge node through which the destination node connects to the network, the frame in dependence upon the ingress bridge nickname and the egress bridge nickname.

31 Claims, 9 Drawing Sheets

OTHER PUBLICATIONS

IEEE Computer Society, "IEEE Std. 802.1ad—2005, IEEE Standard for Local and metropolitan area networks Virtual Bridged Local Area Networks, Amendment 4: Provider Bridges", May 26, 2006.

IEEE Computer Society, "IEEE Std. 802.1Q—2005, IEEE Standard for Local and metropolitan area networks Virtual Bridged Local Area Networks", May 19, 2006.

* cited by examiner

ROUTING FRAMES IN A TRILL NETWORK USING SERVICE VLAN IDENTIFIERS

CROSS-REFERENCE TO RELATED APPLICATION

This application is related to U.S. patent application Ser. No. 12/344,644 filed Dec. 29, 2008, which Applicants hereby incorporate by reference in its entirety.

TECHNICAL FIELD

The present invention relates to the field of computer networking, and in particular to a technique for routing frames in a Transparent Interconnection of Lots of Links (TRILL) network using service virtual local area network (VLAN) identifiers.

BACKGROUND OF THE INVENTION

Early computer networks consisted of a small number of devices attached together using a single cable. Computer networks have since evolved, however, beyond a simple collection of attached devices. Current computer networks may connect thousands of devices spread across large local areas, and these local area networks may in turn be connected together to form still larger networks such as, for example, the Internet.

Today's computer networks often interconnect widely-disparate devices distributed throughout multiple local networks into a single virtual network. Virtual networking technology allows devices located on a single physical network to operate as part of multiple virtual networks. Such virtual networks provide flexibility not available in early computer networks and allow network administrators to create layers of abstraction to simply complex network topologies. For example, using a virtual network, an enterprise may have a virtual blade server chassis with routers spread across multiple physical locations that effectively acts as a single router, allowing a data center split across multiple sites to act as if the data center is a single site.

The predominate standard used to construct and access today's computer networks is Ethernet. Ethernet is a family of frame-based computer networking technologies for local area networks. Ethernet is promulgated by Institute of Electrical and Electronics Engineers (IEEE) in various standards specifications as part of the IEEE 802 family of standards. Ethernet defines a number of wiring and signaling standards for the Physical Layer of the Open Systems Interconnection (OSI) Networking Model, the means for network access at the Media Access Control (MAC) and Data Link Layer, and a common addressing format. At the physical layer, Ethernet networks are ubiquitous, carrying all kinds of traffic over multiple types of physical connections (wired or wireless), including 10 Mbps, 100 Mbps, 1 Gbps, 10 Gbps, 100 Gbps connections. The Ethernet service layer, generally referred to as Layer-2 because it is the MAC and Data Link Layer in the OSI networking model, provides the services generally required by a network. These network services typically include filtering, replication, forwarding broadcast, unicast, and multicast (BUM) traffic, and following a serviced topology, which may include virtual local area networks (VLANs), ATM segments of VLANs based on the ATM Lane Standard (ELANs), Ethernet Private Lines (ELINEs), and rooted multipoint Ethernet virtual connections (ETREEs).

VLAN services are specified in the IEEE 802.1Q standard and allow enterprise customers to configure various computing devices to communicate as if those devices were attached to the same broadcast domain, regardless of their physical locations. VLANs provide segmentation services traditionally provided by routers in local area network (LAN) configurations and address issues such as scalability, security, and network management. Bridges in VLAN topologies enforce the integrity of VLAN broadcast domains because such bridges are not permitted to bridge network traffic between VLANs. In this way, VLANs may provide broadcast filtering, security, address summarization, and traffic flow management. Network administrators may use VLANs to create multiple Layer 3 networks on the same Layer-2 bridge. For example if a Dynamic Host Configuration Protocol (DHCP) server, which broadcasts its presence, were plugged into a bridge, the DHCP server would serve any host device connected to the bridge. By using VLANs, however, a network administrator may easily split up the devices on the network so that some hosts will not use that DHCP server and will default to link-local addresses.

Because enterprise customers often have multiple networks distributed across multiple physical sites, customer's typically connected these physically separate networks together through the network of a network provider. For example, a company may connect its network at site A to its network at site B through a network provided by a telecommunications company. Despite the customer networks being connected through a provider network, devices on the different customer networks may still use VLAN services to communicate through the provider's network as though the devices were all located on the same LAN.

For the same reasons that enterprise customers take advantage of the VLAN services described in the IEEE 802.1Q specification, network providers also take advantage of VLAN services to provide flexibility, security, traffic flow management, and reduce their network administration burden. The drawback, however, is that under the IEEE 802.1Q specification, there are only 4096 identifiers available to specify different VLANs. Thus, a network provider and all the customers that provider serves must share the 4096 VLAN identifiers.

Because industry participants deemed such a limited number of VLAN identifiers inadequate to meet the needs of both customers and providers, the IEEE 802.1Q standard was amended by the IEEE 802.ad standard, often referred to as "Q-in-Q" or "stacked VLANs." The IEEE 802.ad standard sets forth an architecture and bridge protocol to provide separate instances of MAC network services to multiple independent users of a provider network in a manner that does not require cooperation among the customers, and requires a minimum of cooperation between the customers and the provider of the MAC network service. Q-in-Q provides customers with the ability to configure their own VLANs inside the VLAN provided to the customer by a service provider. In such a manner, the service provider may configure one service VLAN for the customer, and the customer can utilize that service VLAN to establish multiple customer VLANs.

In a manner similar to enterprise customers, network service providers often maintain multiple provider network domains, which are bridged together using a provider backbone bridging network. IEEE promulgates specifications for such a provider backbone bridging network in the IEEE 802.1ah standard. IEEE 802.1ah compliant networks provide complete separation of customer and service provider domains by encapsulating Ethernet frames with a service provider MAC header. Because the Ethernet frames are originally encapsulated in the customer network with a customer MAC header, this subsequent encapsulation with a service provider MAC header is often referred to as 'MAC-in-MAC encapsulation.' Using MAC-in-MAC encapsulation, Ethernet frames being sent in a customer's network from one domain to another through multiple service provider network domains contain two MAC headers. The customer MAC header provides routing information to the bridges in the customer's networks, while the service provider MAC header provides routing information to the bridges in the service provider's backbone bridging network.

To provide an overview of Ethernet header stacking of encapsulation, FIG. 1 sets forth a line drawing that illustrates exemplary Ethernet frame structures compliant with the IEEE 802.1 family of standards. FIG. 1 illustrates a traditional Ethernet frame 100 implemented in a customer's network according to the IEEE 802.1D standard. The customer frame 100 consists of a payload 101, a header type (EthType) 102 indicating that frame 100 is an 802.1D frame, a customer network source MAC address (C-SA) 103, and a customer network destination MAC address (C-DA) 104. The customer network source MAC address 103 specifies the source node in the customer network that originates the frame 100, while the customer network destination MAC address 104 specifies the destination node in the customer network to which the frame is bound for delivery.

As mentioned above, a customer may organize the nodes into varies VLANs to provide traffic flow management, security, ease network administration, and the like. VLANs established by a customer for use within the customer's networks are generally referred to a 'customer VLANs.' In a network using customer VLANs, frame 100 is encapsulated as frame 110 to include a customer VLAN identifier (C-VID) 115 and a new header type (EthType) 116, indicating that the frame 110 is an 802.1Q frame. As used in this application, encapsulation may allow additional fields to be placed in any position relative to the encapsulated object, including interior to the original object, and does not require the additional fields be placed surrounding or at either end of the encapsulated object.

In a provider bridge (PB) network that bridges two customer networks, the frame 110 is further encapsulated as shown by frame 120, adding new fields for: a service VLAN identifier (S-VID) 127, and a new header type (EthType) 128 indicating the frame 120 is IEEE 802.1ad compliant. In a provider backbone bridging (PBB) network that bridges multiple PB networks, the frame 120 is further encapsulated to add additional fields for: a service identifier (I-SID) 131, a new header type (EthType) 132 corresponding to the service identifier 131, a backbone VLAN identifier 133, an additional header type (EthType) 134 indicating that the frame 130 is IEEE 802.1ah compliant, a backbone source MAC address (B-SA) 135 specifying the bridge through which the frame ingresses into the PBB network, and a backbone destination MAC address (B-DA) 136 specifying the bridge through which the frame egresses the PBB network.

For further explanation of header stacking or encapsulation in a IEEE 802.1ad provider bridge network, FIGS. 2 and 3 set forth network diagrams that illustrate an exemplary provider bridge network 200 interconnecting exemplary networks for customers A and B (201 and 202, respectively). In FIGS. 2 and 3, customer A 201 maintains three networks 203, 205, 207, while customer B 202 maintains two networks 204, 206. The provider bridge network 200 consists of six bridges, four provider edge bridges (PEB) 1-4 and two provider core bridges (PCB) 1-2. An edge bridge is a bridge through which frames ingress and egress the network 200—that is, an edge bridge is positioned at the 'edge' of the network topology. A core bridge is a bridge used to interconnect one or more edge bridges.

FIG. 2 illustrates a frame 220 at several stages as the frame 220 traverses the networks of FIG. 2 from customer equipment (CE)-11 210 in network 203 of customer A 201 to CE-31 212 in network 205 of customer A 201. In FIG. 2, the communications between CE-11 210 and CE-31 212 are implemented using a customer VLAN, and so the frame 220a from CE-11 210 is encapsulated with a customer VLAN header 230 that includes a customer VLAN identifier (C-VID) and a header type (EthType) specifying that the frame 220a is an IEEE 802.1Q compliant frame. The frame 220 includes a source MAC address (CE-11-SA) for CE-11 210, which indicates that CE-11 210 originated the frame 220a, and a destination MAC address (CE-31-DA) for CE-31 212, which indicates that the frame 220 is destined for CE-31 212.

When provider edge bridge (PEB)-1 240 receives the frame 220a, PEB-1 240 encapsulates the frame 220a into an 802.1ad frame 220b by adding a service VLAN header 231 to the frame 220. The service VLAN header 231 includes a service VLAN identifier (S-VID-A) assigned by the provider to customer A 201 and a header type (EthType) specifying that the frame is IEEE 802.1ad compliant. Using the service VLAN identifier to identify devices in the networks 203, 205, 207 of customer A 201, the provider bridges learn information about the MAC addresses of the computing devices in customer A's networks. From the learned MAC information, the provider bridges route the frame 220 through the provider network 200 from the PEB-1 240 through which the frame 220 ingresses the network 200 to the PEB-3 242 through which the frame 220 egresses the network 200. PEB-3 242 then de-encapsulates the frame 220b by removing to service VLAN header 231, leaving IEEE 802.1Q compliant frame 220a for delivery to CE-31 212.

Similarly, in FIG. 3, computing device CE-15 310 in network 204 of customer B 202 sends an IEEE 802.1Q compliant frame 320a to device CE-25 312 customer B's network 206. At PEB-1 240, frame 320a is encapsulated with a service VLAN header 331. The service VLAN header 331 includes a service VLAN identifier (S-VID-B) assigned by the service provider to customer B 202 and a header type (EthType) specifying that the frame is IEEE 802.1ad compliant. The ingress bridge 240 of the provider network 200 forwards the frame 320b to the egress bridge 342 of the provider network 200, which in turn de-encapsulates the frame 320b by removing the service VLAN header 331, leaving IEEE 802.1Q compliant frame 320a for delivery to CE-35 312. As the provider bridges receive various frames on their ports, the bridges learn the MAC addresses of the devices in customer B network by monitoring the MAC addresses associated with each service VLAN identifier assigned to customer B 202 by the network provider.

From the description above, one of ordinary skill in the art will note that in a provider bridge network, the service provider uses one or more SVLANs to transport frames for a customer's VLANs between multiple customer networks. To determine the forwarding path for each service VLAN through the provider's bridge network, the provider bridges often use the Generic VLAN registration protocol (GVRP) or the Multiple VLAN Registration Protocol (MVRP). For multicast traffic containment, provider bridges may use the Generic Attribute Registration Protocol Multicast Registration Protocol (GMRP) or the Multiple Multicast Registration Protocol (MMRP). For purposes of forwarding traffic, provider edge bridges learn all customer equipment MAC addresses and forward customer frames based on service VLAN identifier and customer VLAN identifier pairs, while provider core bridges learn all customer equipment MAC addresses, but forward customer frames based only on the service VLAN identifiers. Within a particular provider bridge network, a given customer equipment MAC address is at the same site for all service VLANs.

Even with the stacked VLAN protocols, provider bridge networks have scaling problems. Because only 4,096 service VLAN identifiers are available under current protocols, provider bridge networks are limited in the number of customer networks they can serve effectively and efficiently. Further, because provider bridges learn the MAC addresses for all customer devices, scaling issues often arise when a provider serves one or more customers with large virtual networks. In addition, there is a potential for interaction between customer and service provider control protocols.

Provider Backbone Bridge (PBB) Networks are one attempt to alleviate these issues because PBB networks allow a service provider to partition a large provider bridge network into several smaller provider bridge networks that are interconnected by the PBB network. For further explanation, FIG. 4 sets forth a network diagram that illustrates an exemplary provider backbone bridge network 400 interconnecting exemplary provider bridge networks 410, 420, 430. The PBB network 400 of FIG. 4 consists of four provider backbone edge bridges (BEB)—that is, BEB-11 416, BEB-12 418, BEB-21 434, and BEB-22 436—and two provider backbone core bridges (BCB)—that is, BCB-1 401 and BCB-2 402.

FIG. 4 illustrates a frame 412 at several stages as the frame 412 traverses the networks of FIG. 4 from customer equipment (CE)-11 411 to CE-34 431. The customer utilizing the PB networks 410, 430 and the PBB network 400 has grouped CE-11 411 and CE-34 431 in the same customer VLAN. Thus, frame 412a from CE-11 411 includes a customer VLAN header 415. The customer VLAN header 415 includes the customer VLAN identifier (C-VID) assigned by the customer for the customer VLAN and a header type (EthType) that specifies that the frame 412a is IEEE 802.1Q compliant.

When the frame 412a reaches the provider edge bridge (PEB)-11 413, PEB-11 413 encapsulates the frame with a service VLAN header 417. The service VLAN header 417 includes the service VLAN identifier (S-VID) assigned to the customer by the network provider and a header type (EthType) that specifies that the frame 412a is IEEE 802.1ad compliant.

When the frame 412b reaches the provider backbone edge bridge (BEB)-11 416, BEB-11 416 encapsulates the frame with a backbone header 419. The backbone header 419 includes a service identifier (I-SID), a new header type (EthType) corresponding to the service identifier, a backbone VLAN identifier, an additional header type (EthType) indicating that the frame 412c is IEEE 802.1ah compliant, a backbone source MAC address (BEB-11-SA) specifying the backbone edge bridge through which the frame ingresses into the PBB network 400, and a backbone destination MAC address (BEB-22-DA) specifying the backbone edge bridge 436 through which the frame egresses the PBB network 400.

The frame 412c is routed through the provider backbone bridge network 400 from the ingress bridge, BEB-11 416, to the egress bridge, BEB-22 436. BEB-22 436 de-encapsulates the frame 412c by removing the backbone header 419, leaving the frame 412 IEEE 802.1ad compliant. BEB-22 436 then sends the frame 412 along to PEB-31 433 in the IEEE 802.1ad compliant provider bridge network 430. PEB-31 433 further de-encapsulates the frame 412 by removing the service VLAN header 417, leaving the frame 412 IEEE 802.1Q compliant. PEB-31 433 then forwards the frame 412 along to CE-34 431 for delivery.

In a provider backbone bridge network, there is clear demarcation between customer and service provider domains. MAC address learning for customer equipment is limited to the provider edge bridge, and the I-SID field allows separation of Ethernet as a service from Ethernet as infrastructure.

As mentioned above, the networking architectures described by the IEEE 802.1Q, 802.1ad, and 802.1ah standards allow enterprise customers to establish multiple networks that are geographically dispersed, yet operate as a single virtual network. These physically separate LANs communicate through PB and PBB networks using forwarding trees established using a spanning tree protocol. The spanning tree protocol is an OSI Layer-2 protocol that ensures a loop-free topology for any bridged LAN. This protocol allows a network design to include spare (redundant) links to provide automatic backup paths if an active link fails, without the danger of bridge loops, or the need for manual enabling or disabling of these backup links. Bridge loops must be avoided because such loops result in traffic that floods the network. The spanning tree protocol is defined in the IEEE 802.1D standard, and, as the name suggests, it creates a spanning tree within a mesh network of connected Layer-2 bridges, and disables those links that are not part of the tree, leaving a single active path between any two network nodes.

There are certain disadvantages to the spanning tree protocol used in the networks described above with reference to FIGS. 1-4. Because the spanning tree protocol disables links that are not part of the forwarding tree, bottlenecks are often created by concentrating traffic onto selected links. Also, due to the nature of the spanning tree protocol temporary loops may develop if spanning tree messages are lost or as the network topology changes because nodes are brought on-line or taken off-line or moved in the network. During periods when temporary loops exists, frames may flood the network because the standard Ethernet header does not contain a time-to-live field or hop count that specifies when a frame has become stale and should be discarded. Further, the paths developed between nodes of the network are not necessarily the pair-wise shortest path, but rather are the paths that remain after the spanning tree protocol eliminates redundant paths.

In an attempt to create a network solution without the disadvantages of the spanning tree protocol, the Internet Engineering Task Force (IETF) has sought developed additional protocols. One such protocol is the "Transparent Interconnection of Lots of Links" (TRILL) protocol. The TRILL protocol and other similar specifications require the use of router-bridges (R-Bridges) to routes frames hop-by-hop through the network along the shortest path to the frames destination in the network, e.g., the network's edge bridge. For further explanation, FIG. 5 sets forth a network diagram that illustrates an exemplary TRILL network 500, also known as a router-bridge network, because the devices behave as both a router and a bridge at the ISO Layer-2 level. The TRILL network 500 includes three core router-bridges (CRB)—that is, CRB-4 540, CRB-5 542, and CRB-6 544—as well as five edge router-bridges (ERB)—that is, ERB-1 530, ERB-2 532, ERB-8 534, ERB-9 536, and ERB-7 538. The TRILL network 500 is provided to customers by a network provider. The edges of the TRILL network 500 typically extend into the datacenter where the customer equipment is housed. In fact, often each equipment rack includes a bridge that operates as an edge of the TRILL network 500. These TRILL networks can extend throughout one or more datacenters to interconnect various networks.

The TRILL network 500 of FIG. 5 interconnects two IEEE 802.1Q networks 510, 520. 802.1Q network 510 is connected to the TRILL network 500 through ERB-1 530 and ERB-2 532. 802.1Q network 520 is connected to the TRILL network 500 through ERB-8 534 and ERB-536. 802.1Q network 510 includes a legacy bridge (LB)-55 514 and a enterprise bridge (EB)-16 516, neither of which are TRILL compliant. 802.1Q network 520 includes EB-85 524 and EB-96 526. End point devices include customer equipment (CE)-11 512 connected to LB-55 514, CE-31 522 connected to EB-85 524, and CE-77 539 connected to ERB-7 538. End point devices CE-11 512, CE-31 522, and CE-77 539 can be any type of computing device, including workstations, servers, network devices, and so on.

FIG. 5 illustrates a frame 518 at several stages as the frame 518 traverses the networks of FIG. 5 from CE-11 512 to CE-31 522. The customer utilizing the TRILL network 500 to bridge multiple 802.1Q networks has grouped CE-11 512 and CE-31 522 in the same customer VLAN. Thus, frame 518a sent by LB-55 514 for CE-11 512 includes a customer VLAN header 519. The customer VLAN header 519 includes the customer VLAN identifier (C-VID) assigned by the customer for the customer VLAN and a header type (EthType) that specifies that the frame 518a is IEEE 802.1Q compliant.

When the frame 518a reaches the ERB-1 530, ERB-1 530 encapsulates the frame 518 with a TRILL header 551. The TRILL header 551 includes a TRILL source nickname (ERB-1-SN) specifying ERB-1 as the ingress edge router-bridge for the frame 518, a TRILL destination nickname (ERB-8-DN) specifying ERB-8 534 as the egress edge router-bridge for the frame 518, various TRILL flags, a hop count, and a header type (EthType) indicating that frame 518b is a TRILL frame. TRILL nicknames are assigned to every router-bridge in a TRILL network using a dynamic nickname acquisition protocol or other protocols as will occur to those of skill in the art.

To provide the hop-by-hop routing in accordance with the TRILL protocol, ERB-1 530 uses MAC-in-MAC encapsulation to add an Ethernet MAC header 552 to frame 518. The MAC header 552 includes a outer transport VLAN identifier (OT-VLAN-ID), a header type (EthType), a source MAC address (ERB-1-SA) specifying ERB-1 530 as the node transmitting the frame 518b on the next network hop through the network 500, and a destination MAC address (CRB-5-DA) specifying CRB-5 542 as the node receiving the frame 518b on the next network hop through the network 500. ERB-1 530 then sends the frame 518 to CRB-5 542, which routes the frame through the TRILL network 500 to CRB-4 540 based on a shortest path to ERB-8 534. As the frame traverses the TRILL network 500, the MAC header 552 is changed at each hop to update the source and destination MAC addresses for the next network hop. Accordingly, when the frame 518c passes from CRB-4 540 to ERB-8 534, the frame 518 includes MAC header 562. The MAC header 562 of FIG. 5 includes a source MAC address (CRB-4-SA) specifying CRB-4 540 as the node transmitting the frame 518c on the next network hop through the network 500 and a destination MAC address (ERB-8-DA) specifying ERB-8 534 as the node receiving the frame 518c on the next network hop through the network 500. Upon receiving the frame 518c, ERB-8 534 de-encapsulates the frame 518 by removing the MAC header 562 and the TRILL header 551, leaving frame 518a for delivery to CE-31 522 through EB-85 524.

The TRILL network 500 of FIG. 5 operates as a massive switch fabric from the perspective of the customer network. Frames enter the TRILL network at an ingress bridge and are routed along the shortest path hop-by-hop through the TRILL network to an egress bridge for delivery to a customer network. As the bridges in the TRILL network learn the MAC address of the customer equipment in the customer networks to which the TRILL bridges connect, the TRILL bridges share information among one another about which customer MAC addresses related to which TRILL bridge nickname. ISO Layer-2 frames with known unicast addresses are routed hop-by-hop based on TRILL nicknames of the ingress and egress edge router-bridges by the transit or core router-bridges. ISO Layer-2 multicast traffic can also be routed hop-by-hop based on multicast distribution trees.

In addition to TRILL, there are other provider bridging protocols such as Shortest Path Provider Backbone Bridging (SPPBB) described in IEEE 802.1aq that represent attempts by industry participants to utilize the shortest path through the network to forward frames between edge bridges. One feature common to all of these solutions however, whether TRILL, SPPBB, or any other, is the use of MAC-in-MAC encapsulation. Unfortunately, current generation hardware for typical rack-mounted bridges, that form the edge of these networks, do not support MAC-in-MAC encapsulation, thereby limiting the use of TRILL, SPPBB, and similar solutions that provide shortest path routing at Layer-2 level.

BRIEF SUMMARY OF THE INVENTION

Methods, apparatus, and products are disclosed for routing frames in a TRILL network using service VLAN identifiers. Routing frames in a TRILL network using service VLAN identifiers according to embodiments of the present invention advantageously does not require edge bridges that support MAC-in-MAC encapsulation to overcome the 4096 VLAN identifier limitation across multiple, interconnected IEEE 802.1 Q networks. Rather, such edge bridges need only be updated with software improved for routing frames using bridge identifiers according to embodiments of the present invention. In this manner, existing rack-mounted bridges may be utilized as edge bridges in networks that require MAC-in-MAC encapsulation to provide shortest path forwarding services such as, for example, TRILL networks or SPB networks.

In accordance with embodiments of the present invention, the TRILL network in which frames are routed using service VLAN identifiers includes a plurality of bridge nodes. At least one of the bridge nodes operates as an ingress bridge node through which frames are received into the network. At least one of the bridge nodes operates as an egress bridge node through which frames are transmitted out of the network. A bridge node in the network receives a frame from the ingress bridge node for transmission to a destination node. The destination node is connected to the TRILL network through the egress bridge node, and the source node originating the frame is connected to the TRILL network through the ingress bridge node. The received frame includes a customer VLAN identifier, a service VLAN identifier for the ingress bridge node, and a destination node address for the destination node. As received, the frame does not utilize MAC-in-MAC encapsulation at this point. Rather, the bridge node uses the service VLAN identifier for the ingress bridge node and the destination node address for the destination node to add a TRILL header to the frame that conforms with the TRILL protocol. The TRILL header includes an ingress bridge nickname and an egress bridge nickname. The bridge node then routes the frame to the egress bridge node through which the destination node connects to the network in dependence upon the ingress bridge nickname and the egress bridge nickname.

In accordance with embodiments of the present invention, the frame eventually traverses through the TRILL network to reach a bridge node connected to the egress bridge node by a single hop. The bridge node connected to the egress bridge node by a single hop receives the frame for transmission to a destination node. The frame includes a destination node address for the destination node and a TRILL header, which in turn includes an ingress bridge nickname for the ingress bridge node and an egress bridge nickname for the egress bridge node. The bridge node determines that the frame traverses the egress bridge node on the next hop toward the destination node. Based on this determination, the bridge node replaces the TRILL header with the service VLAN identifier for the ingress bridge node and routes the frame to the egress bridge node. The egress bridge node may then route the frame to the destination node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE SEVERAL VIEWS OF THE DRAWINGS

The accompanying drawings, which are incorporated in and constitute a part of this specification, illustrate implementations consistent with the present invention and, together with the detailed description, serve to explain advantages and principles consistent with the invention.

DETAILED DESCRIPTION OF THE INVENTION

While certain exemplary embodiments are described in detail and shown in the accompanying drawings, it is to be understood that such embodiments are merely illustrative of and not devised without departing from the basic scope thereof, which is determined by the claims that follow.

Although the following disclosure is discussed using terminology related to Ethernet links, various IEEE 802 standards and TRILL, these are merely by way of example and illustration, and the scope of the present invention is not so limited, but extends to the fullest scope defined by the claims herein.

Typical edge bridges used in conjunction with rack-mounted equipment do not support the MAC-in-MAC encapsulation required in current shortest path backbone bridging network solutions, such as for example TRILL network solutions. When various bridges in a TRILL network, however, are modified for routing frames in a TRILL network using service VLAN identifiers according to embodiments of the present invention, edge bridges having hardware that does not support MAC-in-MAC encapsulation can be used as part of a TRILL network solution.

Figure 6:
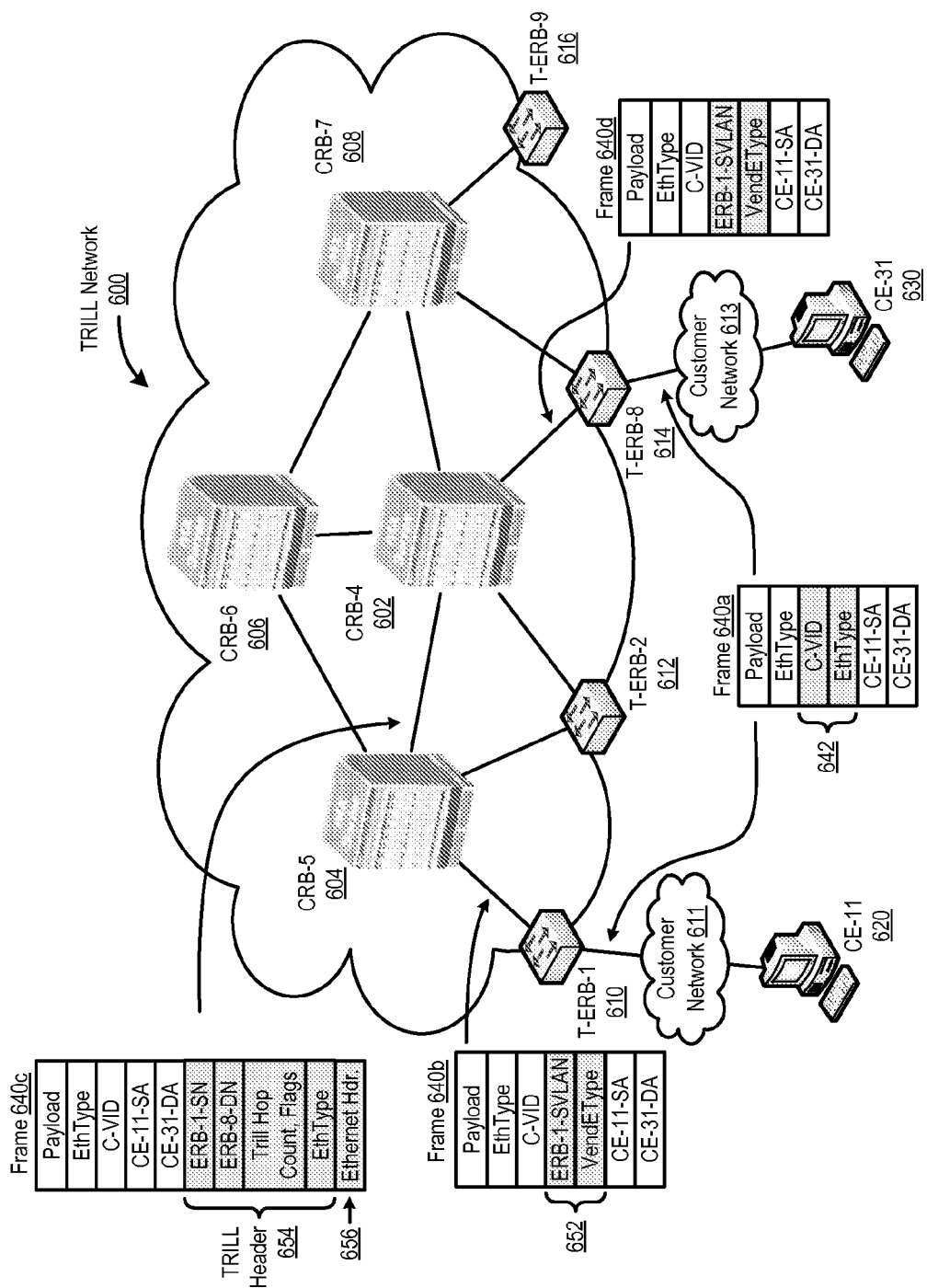
FIG. 6 sets forth a network diagram that illustrates a TRILL network having bridges that support routing frames in a TRILL network using service VLAN identifiers according to embodiments of the present invention.

For further explanation, FIG. 6 sets forth a network diagram that illustrates a TRILL network having bridges that support routing frames in a TRILL network using service VLAN identifiers according to embodiments of the present invention. The TRILL network of FIG. 6 includes four core router-bridges (CRB)—that is, CRB-4 602, CRB-5 604, CRB-6 606, and CRB-7 608—and four edge router-bridges implemented as top-of-rack devices (T-ERB)—that is, T-ERB-1 610, T-ERB-2 612, T-ERB-8 614, and T-ERB-9 616. In the example of FIG. 6, the TRILL network 600 interconnects customer equipment (CE)-11 620 and CE-31 630. CE-11 620 connects to the TRILL network 600 through T-ERB-1 610, while CE-31 630 connects to the TRILL network 600 through T-ERB-8 614. The network 600 of FIG. 6 is referred to as a 'TRILL' network in the sense that at least the core routing bridges have hardware that supports frame routing in accordance with the TRILL protocol.

FIG. 6 illustrates frame 640 in various stages as the frame 640 traverses the networks of FIG. 6. In FIG. 6, the network administrator managing CE-11 620 and CE-31 630 has grouped CE-11 620 and CE-31 630 into a customer VLAN for data communications. Accordingly, frame 640 of FIG. 6 includes a customer VLAN header 642 that includes a customer VLAN identifier (C-VID) identifying the particular customer VLAN to which the CE-11 620 and CE-31 630 are assigned. The VLAN header 642 also includes a header type (EthType) specifying that the frame is an IEEE 802.1Q compliant frame. The frame 640a also includes a source MAC address (CE-11-SA) designating CE-11 620 as the originator of the frame 640a and a destination MAC address (CE-31-DA) designating CE-31 630 as the destination node to which the frame 640 is transmitted.

In the example of FIG. 6, T-ERB-1 610 receives the frame 640a from CE-11 620 through customer network 611. T-ERB-1 610, along with other edge bridges in the TRILL network 600, utilizes service VLAN identifiers to route the frame 640 through the network 600. This service VLAN identifier is similar to service VLAN identifiers used in 802.1ad networks for identifying a service. Within an 802.1ad network, a service VLAN identifier distinguishes frames for customer networks of two or more customers that use the same customer VLAN identifier. The service VLAN identifier often conforms to the IEEE 802.1ad standard, but is not required to do so.

In the example of FIG. 6, each edge bridge 610, 612, 614, and 616 is assigned a unique service VLAN identifier with which that edge bridge stores in each frame entering, or ingressing, into the network 600 from another computer network. The service VLAN identifiers may be assigned to each edge bridge by the service provider supplying the TRILL network 600. Often, however, the service VLAN identifier may be assigned to each edge bridge as part of negotiations among the bridges in the network 600 using any dynamic acquisition control protocol as will occur to those of skill in the art—much in the same way each bridge in the TRILL network 800 acquires its TRILL nickname. In fact, the value of the service VLAN identifier assigned to each edge bridge may be the same as the value of the TRILL nickname for that edge bridge as discussed in more detail below.

T-ERB-1 610 of FIG. 6 has a service VLAN identifier of "T-ERB-1-SVLAN." The T-ERB-1 610 of FIG. 6 adds a service VLAN identifier (T-ERB-1-SVLAN) for the ingress bridge node to the frame 640b by adding a vender header 652 to the frame 640b that includes the service VLAN identifier (T-ERB-1-SVLAN). The vender header 652 is a customized header having a format defined by the vender of T-ERB-1 610. One of skill in the art will note, however, that many different header format may be used, including header formats that are not vender-specific.

In the example of FIG. 6, T-ERB-1 610 routes the frame 640b to a next bridge in the TRILL network 600 that is on a path from the ingress bridge node 610 to the egress bridge node 614 through which the destination node 630 connects to the network 600—that is, CRB-5 604. T-ERB-1 610 of FIG. 6 routes the frame 640b based on the destination node address (CE-31-DA) for the destination node, CE-31 630. T-ERB-1 610 of FIG. 6 uses the destination address to identify the egress bridge 614 through which the destination node connects to the network 600. T-ERB-1 610 learns the edge bridges through which various nodes connect to the network 600 by recording the ingress node identifier-origin node address pairs for the frames that T-ERB-1 610 receives for processing when it operates as an egress node. After identifying the egress bridge through which the destination node connects to the network 600, then T-ERB-1 610 identifies the next node—CRB-5 604—along the shortest path to the egress bridge node 614. T-ERB-1 610 then transmits the frame 640b to CRB-5 604 through the port connecting T-ERB-1 610 to CRB-5 604.

CRB-5 604 of FIG. 6 receives the frame 640b from the ingress bridge T-ERB-1 610 and adds a TRILL header 654 to the frame 640 in dependence upon the service VLAN identifier (T-ERB-1-SVLAN) and the destination node address (CE-31-DA) for the destination node, CE-31 630. The TRILL header 654 is a standard header conforming to the TRILL protocol and includes an ingress bridge nickname and an egress bridge nickname.

As mentioned above, the value that a bridge uses for its service VLAN identifier may be the same value that the bridge uses for its TRILL nickname. However, one of ordinary skill in the art will understand that the same value need not be used because the service VLAN identifier is distinct, or separate, from the TRILL nickname for any particular edge bridge. That is, the service VLAN identifier is generally part of a customized vender header that does not conform to the TRILL protocol, while the TRILL nickname is part of the TRILL header used to route frames according to the TRILL protocol. The bridges in a network generally obtain their TRILL nicknames using a dynamic nickname acquisition protocol described in the "Rbridges: Base Protocol Specification" promulgated by the TRILL Working Group, which is affiliated with the Internet Engineering Task Force.

Figure 1:
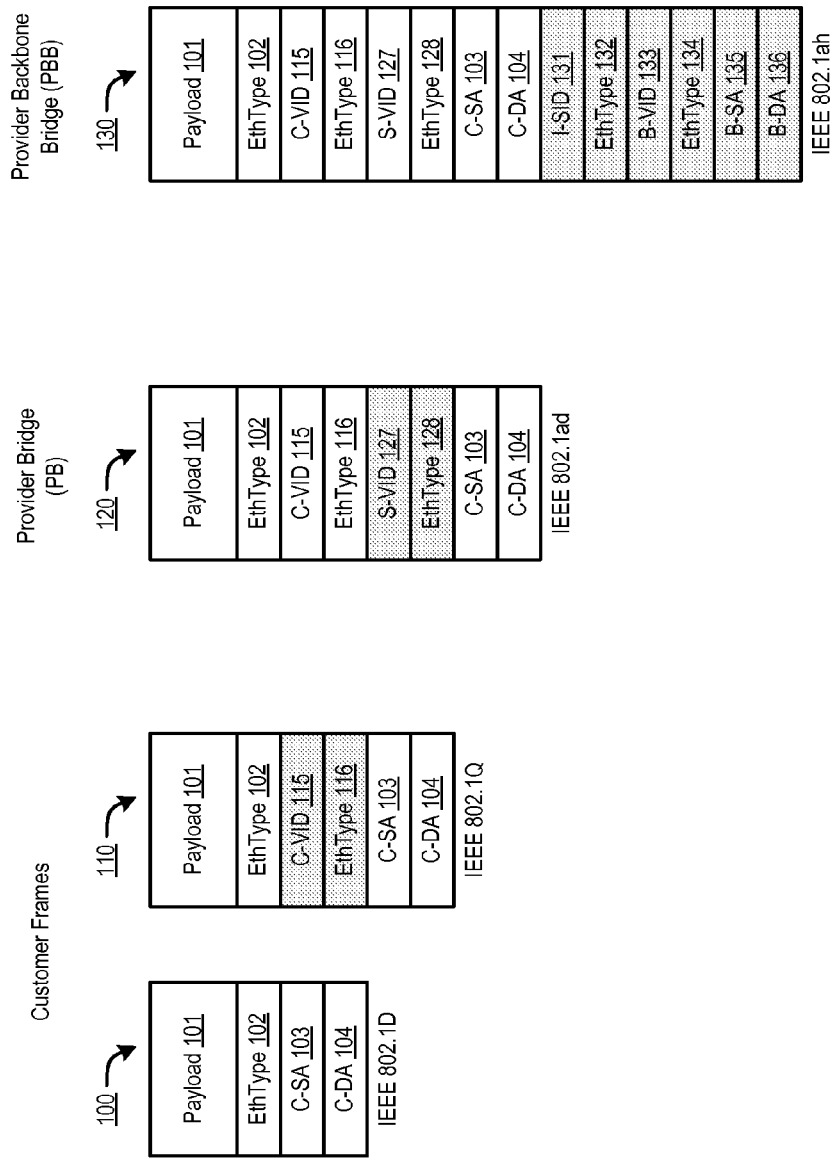
FIG. 1 sets forth a line drawing that illustrates exemplary Ethernet frame structures compliant with the IEEE 802.1 family of standards.
Figure 2:
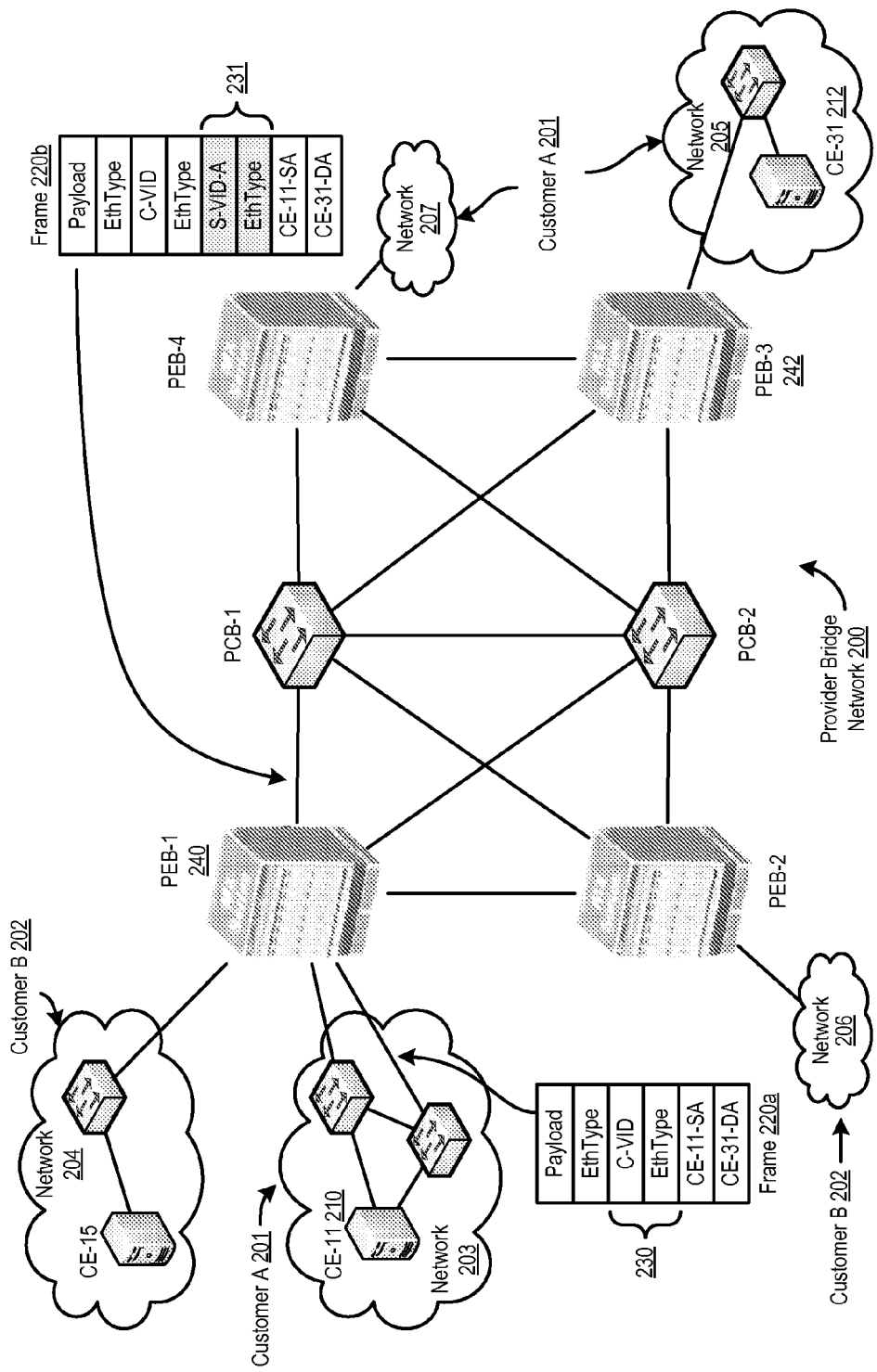
FIG. 2 sets forth a network diagram that illustrates an exemplary provider bridge network interconnecting exemplary customer networks.
Figure 3:
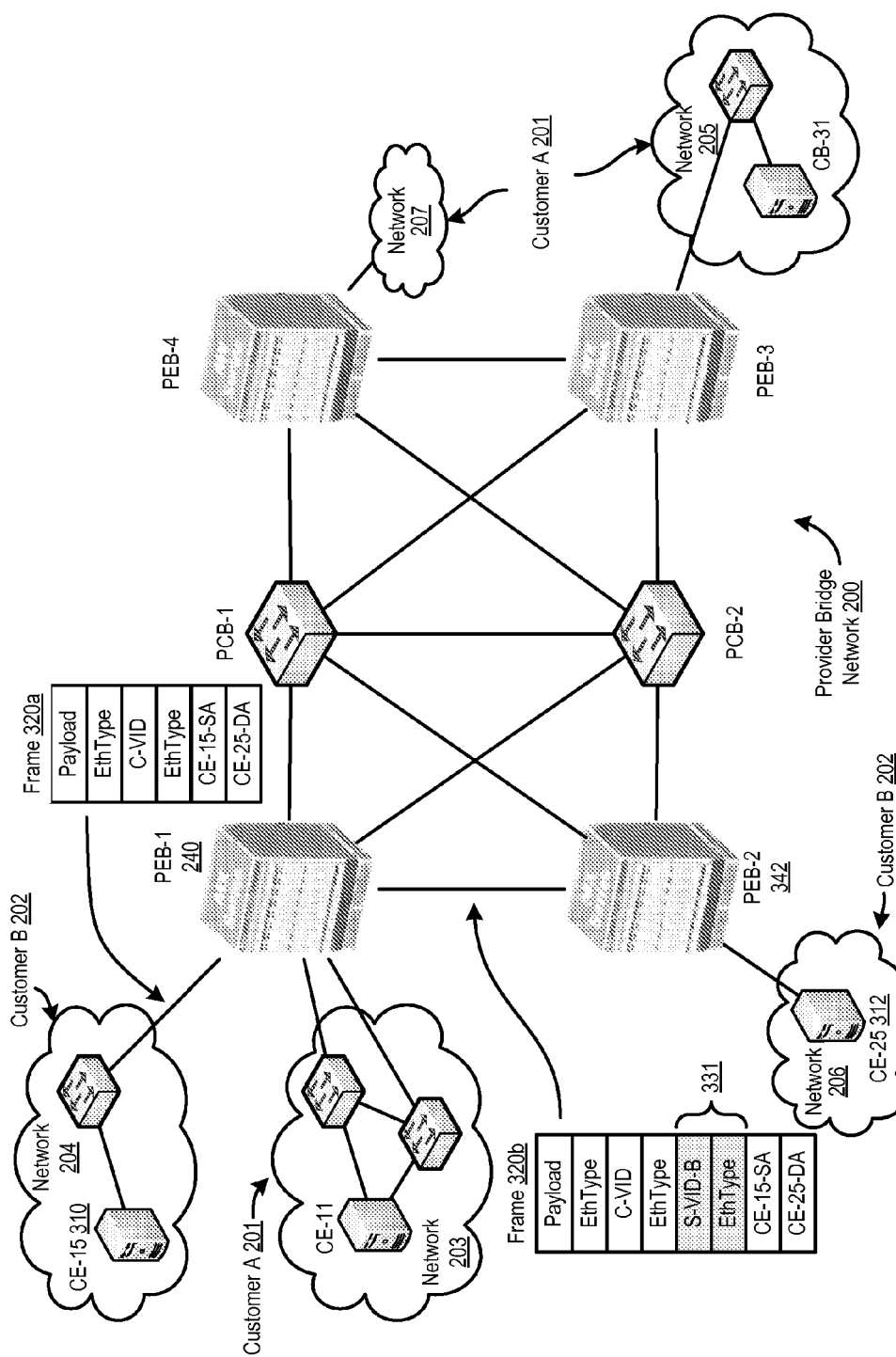
FIG. 3 sets forth a network diagram that illustrates an exemplary provider bridge network interconnecting exemplary customer networks.
Figure 4:
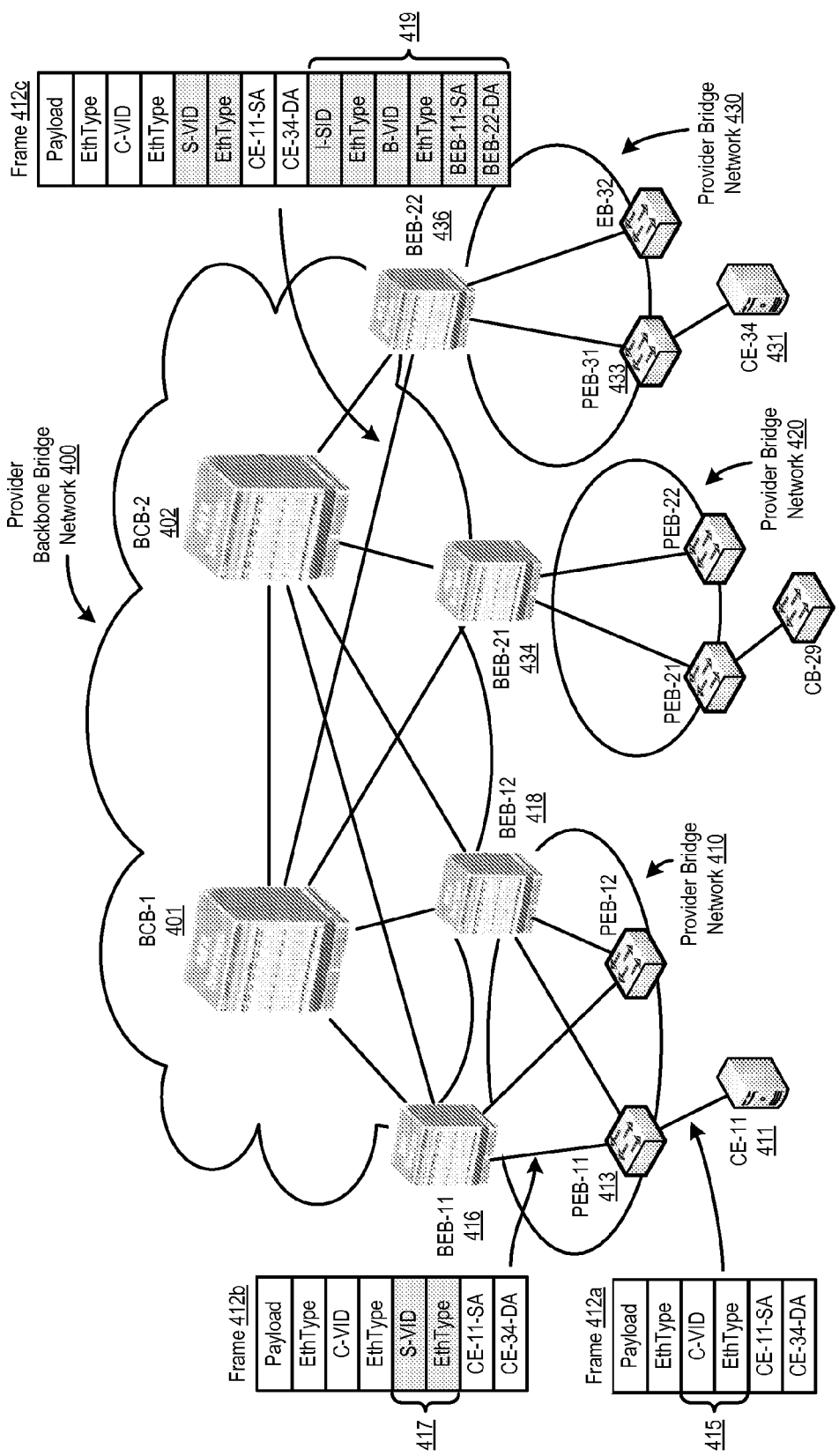
FIG. 4 sets forth a network diagram that illustrates an exemplary provider backbone bridge network interconnecting exemplary provider bridge networks.
Figure 5:
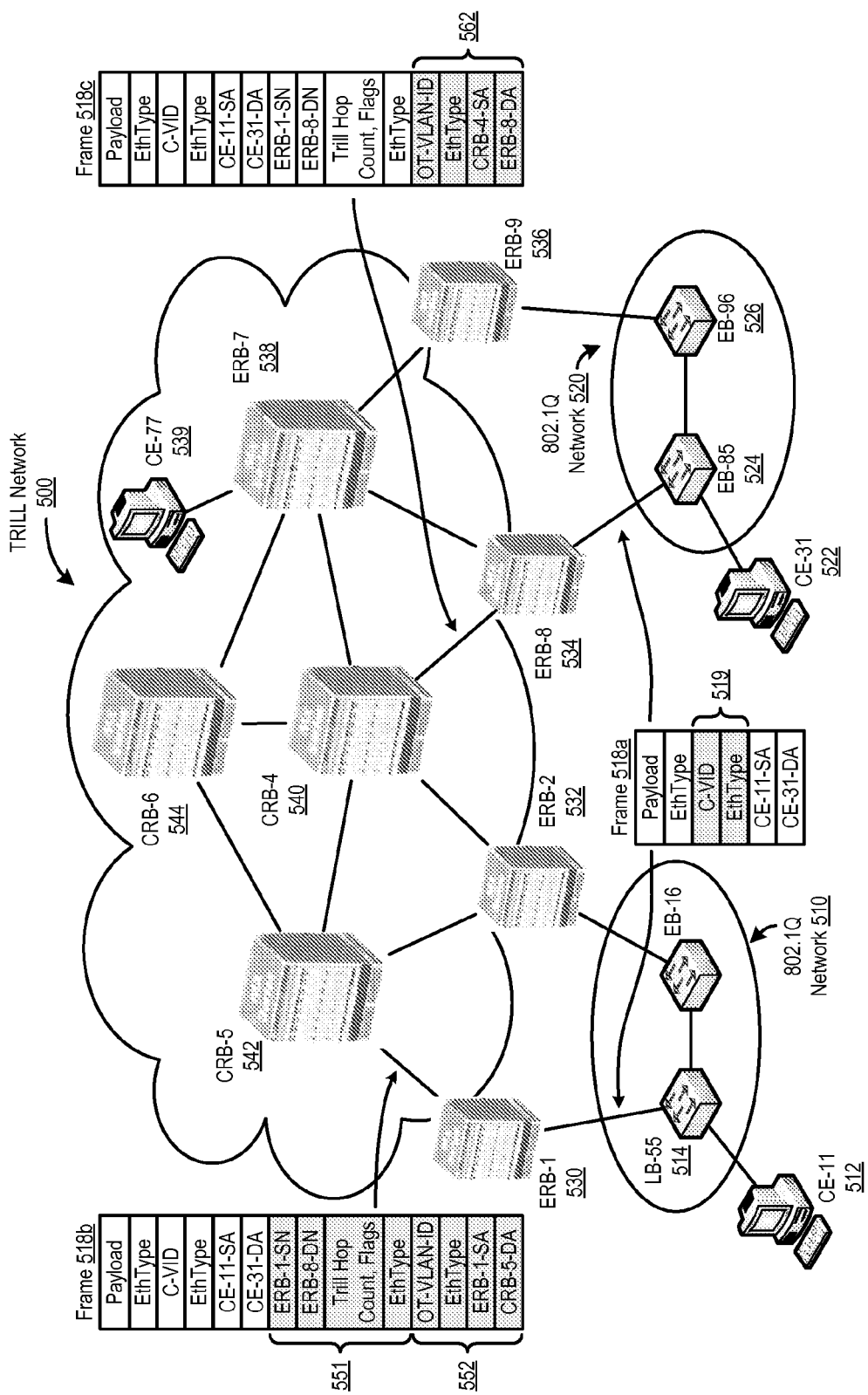
FIG. 5 sets forth a network diagram that illustrates an exemplary TRILL network.

Having a bridge identifier in a vender header distinct from the TRILL nickname in the TRILL header allows bridges to be utilized as edge bridges in the TRILL network 600 that are not capable of encapsulating a frame with a standard TRILL header such as, for example, TRILL header 551 in FIG. 5. For example, in FIG. 6, the hardware of edge router-bridges 610, 612, 614, 616 in FIG. 6 do not support the TRILL protocol. That is, the hardware of edge router-bridges 610, 612, 614, 616 in FIG. 6 are not capable of encapsulating a frame with a standard TRILL header such as, for example, TRILL header 551 in FIG. 5, and utilizing MAC-in-MAC encapsulation required under the TRILL protocol to route the frame from one hop to another through the TRILL network 800. Rather than use the TRILL nicknames for the ingress and egress router-bridges, the edge router-bridges add service VLAN identifiers that are unique for each edge router bridge in the TRILL network 600 of FIG. 6 and are supported by the hardware of those bridges. The ingress bridge has the ability to add these service VLAN identifiers to the frame because, although hardware of edge router-bridges 610, 612, 614, 616 in FIG. 6 cannot add a TRILL header to a frame, the edge router-bridge hardware does support certain stacked headers or customized headers that allows these router-bridges to add the service VLAN identifier for the ingress bridge to the frame 640.

To add the ingress bridge nickname to the TRILL header 654, therefore, CRB-5 604 need only add the value of the service VLAN identifier for the ingress bridge node 610 as the ingress bridge nickname in the TRILL header 654. To add the egress bridge nickname to the TRILL header 654, CRB-5 604 may lookup the service VLAN identifier for the egress bridge node associated with the destination node address in a table that stores such values. The contents of this table may be updated periodically using network control protocol and may be implemented in any manner as will occur to those of ordinary skill in the art. After obtaining the SVLAN identifier for the egress bridge node, CRB-5 604 may then add the value of the SVLAN identifier for the egress bridge node as the egress bridge nickname in the TRILL header 654.

When CRB-5 604 adds the TRILL header 654 in the example of FIG. 6, CRB-5 604 generally removes the vender header 652 that contains the service SVLAN identifier (T-ERB-1-SVLAN) because such a customized vender header 652 is not part of the standard TRILL protocol. One of ordinary skill in the art will note, however, that in some embodiments, the vender header may remain part of the frame as it travels through the core bridges in the TRILL network (600).

In the example of FIG. 6, CRB-5 604 routes the frame 640c to the egress bridge node through which the destination node 630 connects to the network 600 based on the ingress bridge nickname and the egress bridge nickname in the TRILL header 654. Using the ingress bridge nickname and the egress bridge nickname, CRB-5 604 may identify the next bridge in the TRILL network 600 that is on a path from the bridge node to the egress bridge node according to the TRILL protocol. In the example of FIG. 6, the next bridge in the TRILL network 600 that is on a path from the bridge node to the egress bridge node is CRB-4 602. CRB-5 604 may then route the frame 640c to the egress bridge node by encapsulating the frame with an Ethernet header 656 that includes the MAC address for CRB-4 602. CRB-5 604 then routes the frame 640c to the next bridge node, CRB-4 602 in dependence upon the MAC address in the MAC header 656.

In the example of FIG. 6, CRB-4 602 receives the frame 640b from the CRB-5 604 for transmission to CE-31 630. Upon examining the information in the frame 640c, CRB-4 602 determines that the frame 640 traverses the egress bridge node T-ERB-8 614 on the next network hop. Because T-ERB-8 614 does not have the hardware to support TRILL header 654, CRB-4 602 replaces the TRILL header 654 with a customized vender header that includes the service VLAN identifier (ERB-1-SVLAN) for the ingress bridge 610. CRB-4 602 then routes the frame 640*d* to the egress bridge node T-ERB-8 614. CRB-4 602 knows that egress bridge node T-ERB-8 614 lacks MAC-in-MAC encapsulation capabilities because those capabilities are generally broadcast to other nodes on the network 600 when egress bridge node T-ERB-8 614 initially joins the network 600.

The egress bridge node T-ERB-8 614 in FIG. 6 receives the frame 640*d* from CRB-4 602 for transmission to the destination node CE-31 630. Because customer networks 611, 613 of FIG. 6 are IEEE 802.1Q networks, T-ERB-8 614 removes the service VLAN identifier (T-ERB-1-SVLAN) from the frame 640*d*, leaving frame 640*a*. T-ERB-8 614 then routes the frame 640 for delivery to the destination node CE-31 630 through customer network 613.

When T-ERB-8 614 first receives the frame 640, T-ERB-8 614 records the ingress node identifier-origin node address pair. Recording this value pair allows T-ERB-8 614 to learn that the origin node 620 is connected to the network 600 through edge bridge 610 and utilize the information in the future when T-ERB-8 614 operates as an ingress bridge node. T-ERB-8 614 utilizes such information as an ingress bridge node because T-ERB-8 614 needs to know which edge bridge is the egress bridge node to determine the shortest path through the network 600.

One of ordinary skill in the art will note that in the example of FIG. 6, the first core router-bridge that received the frame from the ingress bridge added a TRILL header to the frame. The core router-bridges then utilized the TRILL nicknames in the TRILL header to route the frame through the network to core bridge directly connected to the egress bridge by a single network hop. In such a manner, once the TRILL header has been added to the frame, the other core bridge-routers that route the frame using the TRILL header need not be configured for routing frames in a TRILL network using service VLAN identifiers according to embodiments of the present invention. Rather, these router-bridges may route the frame in the standard fashion provided by the TRILL protocol. Depending on the topology of the network, therefore, standard router-bridges may be utilized along with router-bridges modified to operate in accordance with embodiments of the present invention.

Figure 7:
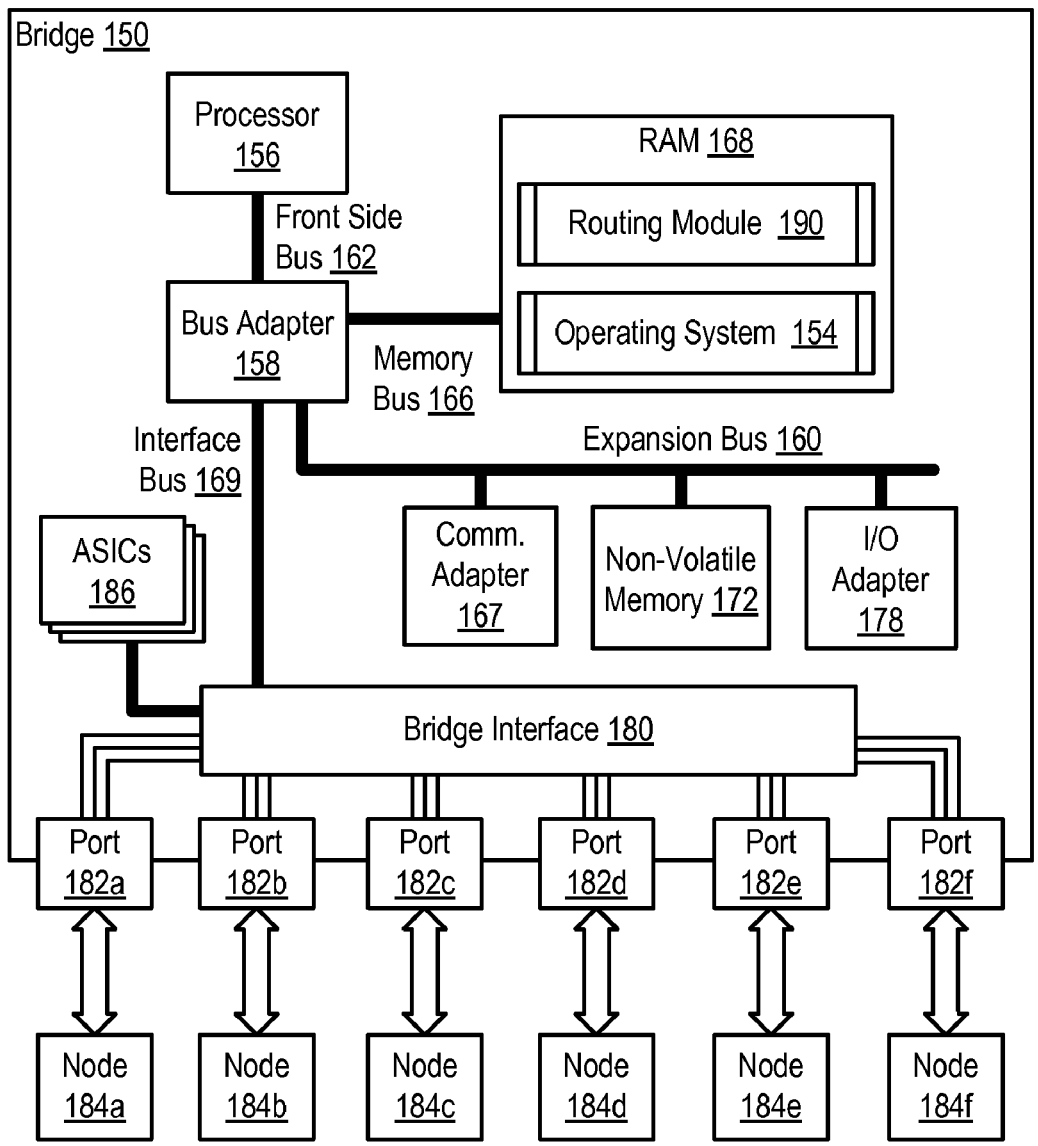
FIG. 7 sets forth a block diagram of automated computing machinery comprising an exemplary bridge useful in routing frames in a TRILL network using service VLAN identifiers according to embodiments of the present invention.

Routing frames in a TRILL network using service VLAN identifiers according to embodiments of the present invention is implemented generally with computers, that is, automated computing machinery. For further explanation, therefore, FIG. 7 sets forth a block diagram of automated computing machinery comprising an exemplary bridge 150 useful in routing frames in a TRILL network using service VLAN identifiers according to embodiments of the present invention. The bridge 150 of FIG. 7 is one of a plurality of bridge nodes included in the computer network. At least one of the bridge nodes in the network operates as an ingress bridge node through which the frames are received into the computer network. Also, at least one of the bridge nodes in the network operates as an egress bridge node through which the frames are transmitted out of the computer network.

In the example of FIG. 7, the exemplary bridge 150 includes at least one processor 156 or 'CPU' as well as random access memory 168 (RAM) which is connected through a high speed memory bus 166 and bus adapter 158 to the processor 156 and to other components of the exemplary bridge 150.

Stored in RAM 168 of FIG. 7 is a routing module 190. The routing module 190 of FIG. 7 is computer program instructions for routing frames in a TRILL network using service VLAN identifiers according to embodiments of the present invention. The TRILL network includes a plurality of bridge nodes. At least one of the plurality of bridge nodes operates as an ingress bridge node through which the frames are received into the TRILL network. At least one of the plurality of bridge nodes operates as an egress bridge node through which the frames are transmitted out of the TRILL network. In the TRILL network, each ingress bridge node and each egress bridge node is assigned a unique service VLAN identifier. As mentioned above, often the value for the service VLAN identifier assigned to each bridge node is the same value as the TRILL nickname acquired by each bridge using a dynamic nickname acquisition protocol described in the "Rbridges: Base Protocol Specification" promulgated by the TRILL Working Group, which is affiliated with the Internet Engineering Task Force.

The routing module 190 of FIG. 7 operates generally for routing frames in a TRILL network using service VLAN identifiers according to embodiments of the present invention by: receiving, from the ingress bridge node, a frame for transmission to a destination node, the destination node connected to the TRILL network through the egress bridge node, the received frame including a customer VLAN identifier, a service VLAN identifier for the ingress bridge node, and a destination node address for the destination node, the received frame not having MAC-in-MAC encapsulation; adding, to the frame in dependence upon the service VLAN identifier for the ingress bridge node and the destination node address for the destination node, a TRILL header conforming to the TRILL protocol, the TRILL header including an ingress bridge nickname and an egress bridge nickname; and routing, to the egress bridge node through which the destination node connects to the network, the frame in dependence upon the ingress bridge nickname and the egress bridge nickname.

The routing module 190 of FIG. 7 also operates generally for routing frames in a TRILL network using service VLAN identifiers according to embodiments of the present invention by: receiving a frame for transmission to a destination node, the destination node connected to the network through the egress bridge node, the frame originating from a source node connected to the network through the ingress bridge node, the frame including a destination node address for the destination node and a TRILL header, the TRILL header including an ingress bridge nickname for the ingress bridge node and an egress bridge nickname for the egress bridge node; determining that the frame traverses the egress bridge node on the next hop toward the destination node; in response to the determination, replacing the TRILL header with the service VLAN identifier for the ingress bridge node; and routing, by the bridge node, the frame to the egress bridge node.

Also stored in RAM 168 is an operating system 154. Operating systems useful in bridges according to embodiments of the present invention may include Juniper Networks' JUNOS® and JUNOSe®, Cisco's IOS®, or Extreme Networks' ExtremeXOS®. Other operating systems that may be useful in bridges according to embodiments of the present invention may include lightweight versions of UNIX™, Linux™, Microsoft XP™, and others as will occur to those of skill in the art. Operating system 154 and routing module 190 in the example of FIG. 7 are shown in RAM 168, but many components of such software typically are stored in non-volatile memory 172 also, for example, Electrically Erasable Programmable Read-Only Memory (EEPROM) or in memory of the application-specific integrated circuits (ASICs) 186.

The bridge 150 of FIG. 7 includes a bridge interface 180 connected to the other component of the bridge 150 through the bus adapter 158. The bridge interface 180 provides ports 182 through which nodes 184 connected to the bridge 150. The nodes 184 may be implemented as servers, workstations, network devices, or any other computing device as will occur to those of skill in the art. The bridge interface 180 of FIG. 7 includes switching circuitry controlled by the processor 156 or ASICs 186. The switching circuitry of the bridge interface 180 provides high-speed switching services to rapidly receive frames on one port and forward those frames on to their ultimate destination through another port. The switching circuitry may also provided limited processing capabilities offloaded from the ASICs 186 or the processor 156.

In the example of FIG. 7, the ASICs 186 connected to the bridge interface 180 provide certain frame processing services in an effort to offload processing from the main processor 156. For example, the ASICs 186 may be used to provide filtering, replication, forwarding, encapsulation, or de-encapsulation services. Even still, the ASICs 186 may contain and execute the routing module 190 as described above.

The exemplary bridge 150 of FIG. 7 includes a bus adapter 158, a computer hardware component that contains drive electronics for the high speed buses, the front side bus 162 and the memory bus 166, as well as drive electronics for the interface bus 169 and the slower expansion bus 160. Through the expansion bus 160 of FIG. 7, the communications adapter 167, non-volatile memory 172, and I/O adapter 178 are connected to the other components of the exemplary bridge 150.

The exemplary bridge 150 of FIG. 7 includes one or more input/output ('I/O') adapters 178. I/O adapters 178 provide components that allow the processor 156 to interface with various I/O components of the bridge. Exemplary I/O components may include, for example, light-emitting diodes (LEDs), liquid-crystal displays (LCDs), physical switches and buttons, or other interface components as will occur to those of skill in the art.

The exemplary bridge 150 of FIG. 7 also includes a communications adapter 167 for data communications with other computing devices out of band from the network communications through ports 182. The communications adapter 167 may provide the processor 156 with an interface according to the Universal Serial Bus (USB) specification, Small Computer System Interface (SCSI) specification, RS-232 specification, Inter-Integrated Circuit (I²C) bus protocol, a System Management Bus (SMBus) protocol, an Intelligent Platform Management Bus (IPMB) protocol, or the like.

One of ordinary skill in the art will note that the exemplary implementation of the bridge 150 of FIG. 7 is for explanation only and not for limitation. Other computing architectures as will occur to those of skill in the art may also be useful for routing frames in a TRILL network using service VLAN identifiers according to embodiments of the present invention. For example, the bridge may be implemented using a general-purpose computer or a specialized computing device dedicated for network frame processing, or other hybrid architectures.

Figure 8:
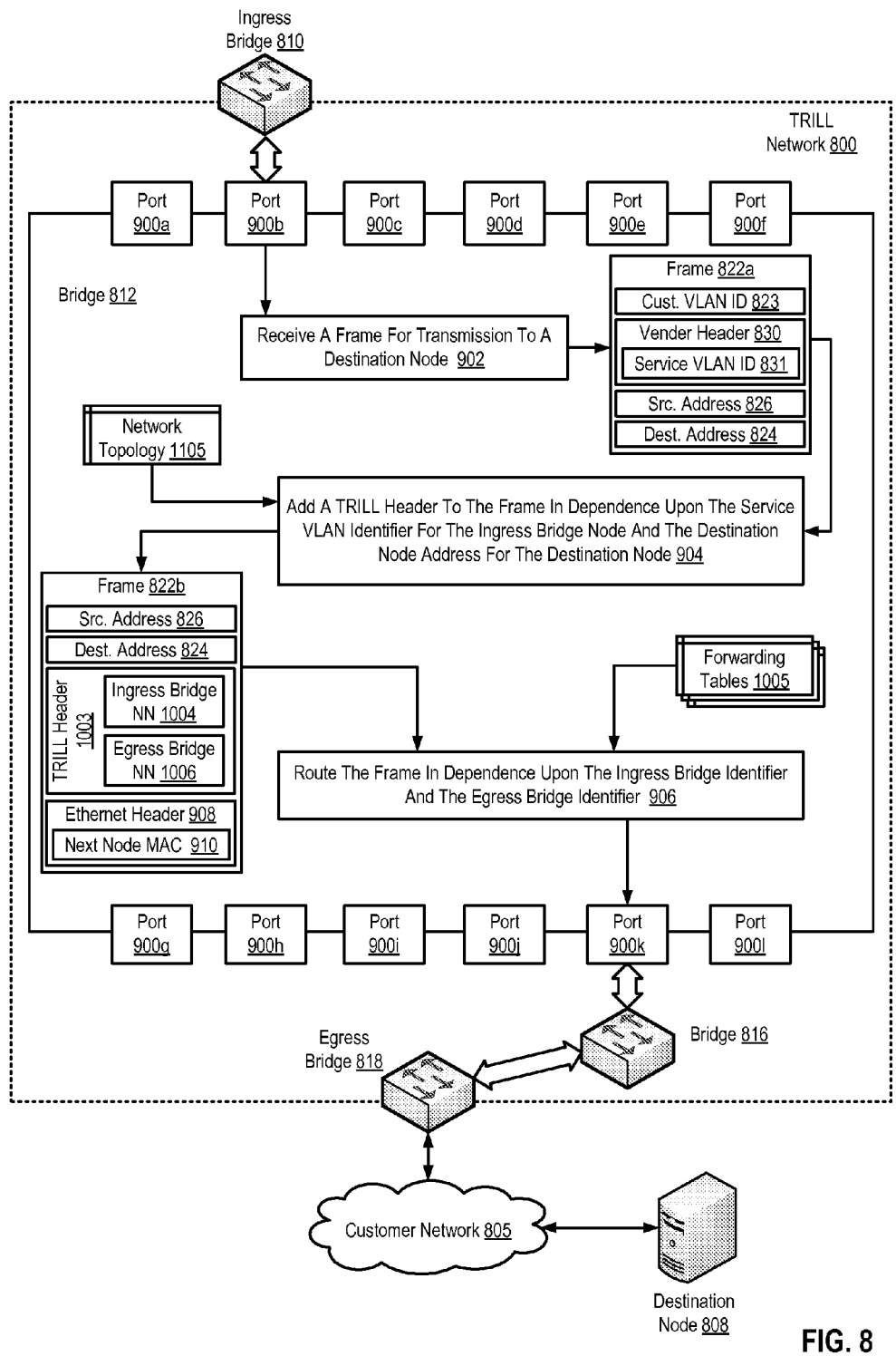
FIG. 8 sets forth a diagram illustrating an exemplary method of routing frames in a TRILL network using service VLAN identifiers according to embodiments of the present invention.
Figure 9:
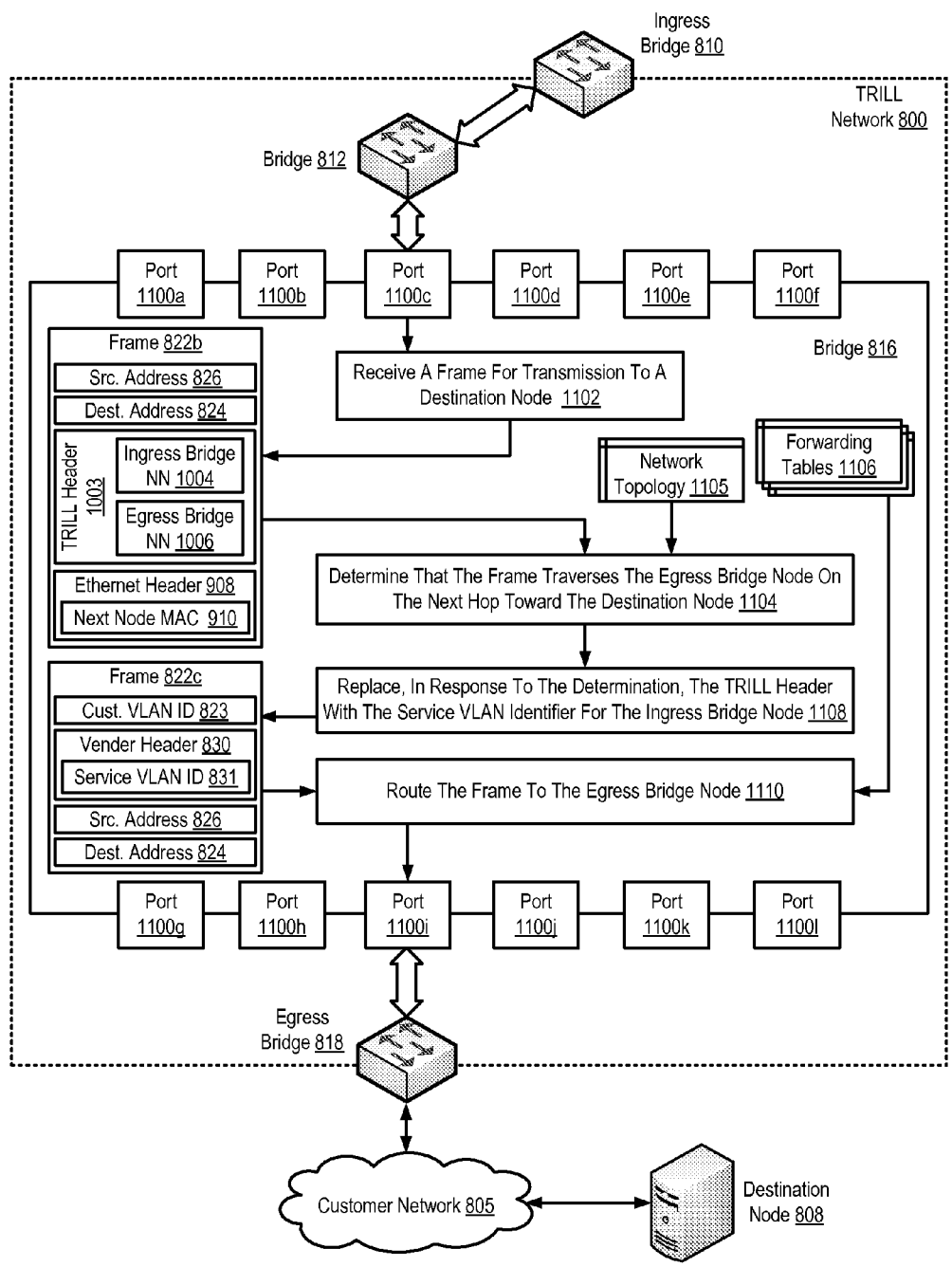
FIG. 9 sets forth a diagram illustrating a further exemplary method of routing frames in a TRILL network using service VLAN identifiers according to embodiments of the present invention.

FIGS. 8-9 provide further explanation of various embodiments of the present invention as different bridges operating according to embodiments of the present invention route a frame through a TRILL network. FIG. 8 sets forth a flow chart illustrating an exemplary method of routing frames in a TRILL network 800 using service VLAN identifiers according to embodiments of the present invention. The TRILL network 800 of FIG. 8 includes a plurality of bridge nodes 810, 812, 814, 816, 818. In FIG. 8, bridge node 810 operates as an ingress bridge node through which the frames are received into the TRILL network 800, and bridge node 818 operates as an egress bridge node through which the frames are transmitted out of the TRILL network 800. In the example of FIG. 8, the hardware of the ingress bridge node 810 and hardware of the egress bridge node 818 do not support MAC-in-MAC encapsulation, and thus are unable to support the TRILL protocol at the hardware level.

The bridge node 812 of FIG. 8 includes twelve ports 900a-l through which other nodes may connect to the bridge node 812. In the example of FIG. 8, the ingress bridge node 810 connects to the bridge node 812 through port 900b. Core bridge node 816 connects to the bridge node 812 through port 900k.

The method of FIG. 8 includes receiving 902, by the bridge node 812 from the ingress bridge node 810, a frame 822 for transmission to a destination node 808. In the example of FIG. 8, the destination node 808 connects to the TRILL network 800 through customer network 805 and the egress bridge node 818. The bridge node 812 may receive 902 the frame 822 from the ingress bridge node 810 according to the method of FIG. 8 by retrieving the frame 822a from a reception stack for port 900b and advancing the stack pointer for the reception stack.

The frame 822a of FIG. 8 specifies a source node address 826 for the source node (not shown) originating the frame 822a and a destination node address 824 for a destination node 808 to which the frame 822 is transmitted. The source and destination node addresses 826, 824 may be implemented as MAC addresses. The frame 822a also includes a customer VLAN identifier 823 that the equipment on the customer network uses to assign the frame 822 to a particular VLAN established across one or more customer networks. The frame 822a further includes a vender header 830 that specifies a service VLAN identifier 831. The service VLAN identifier 831 of FIG. 8 and the frame 822a generally conform to the IEEE 802.1ad standard, but one of ordinary skill in the art will recognize that such conformance is not a required feature in embodiments of the present invention.

The method of FIG. 8 also includes adding 904, by the bridge node 812 to the frame 822 in dependence upon the service VLAN identifier 831 for the ingress bridge node 810 and the destination node address 824 for the destination node 808, a TRILL header 1003 conforming to the TRILL protocol. The TRILL header 1003 includes an ingress bridge nickname 1004 and an egress bridge nickname 1006. As mentioned above, the values for the ingress bridge nickname 1004 and the egress bridge nickname 1006 may be the same as the values of the service VLAN identifiers for the ingress bridge 810 and the egress bridge 818, respectively. Thus, the bridge node 812 may add 904 the ingress bridge nickname 1004 according to the method of FIG. 8 by storing the value of the service VLAN identifier 831 in the frame 822a in the TRILL header 1003 as the ingress bridge nickname 1004. The bridge node 812 may add 904 the egress bridge nickname 1006 according to the method of FIG. 8 by looking up in the network topology 1105 the nickname for the edge bridge through which the destination node 808 connects to the network 800 and storing that value as the egress bridge nickname 1006 in the TRILL header 1003.

The network topology 1105 of FIG. 8 is a table that maintains the network topology for network 800 which defines the data communications connections among the nodes in the network 800. The bridge nodes determines the data communications connections among the nodes based on the control frames exchanged among the nodes according to a control protocol such as, for example, the Intermediate System to Intermediate System ("IS-IS") protocol. The network topology 1105 also associates the edge bridges with the nodes outside of the network 800 that send or receive frames through the network 800. Such a network topology may be implemented and periodically updated in any manner as will occur to those of ordinary skill.

The method of FIG. 8 includes routing 906, by the bridge node 812 to the egress bridge node 818 through which the destination node 808 connects to the network 800, the frame 822*b* in dependence upon the ingress bridge nickname 1004 and the egress bridge nickname 1006. The bridge node 812 may route 906 the frame 822*b* based on the ingress bridge nickname 1004 and the egress bridge nickname 1006 according to the method of FIG. 8 by encapsulating the frame 822*b* with an Ethernet header 908. One of ordinary skill in the art will note at this point the frame 822 now utilizes MAC-in-MAC encapsulation, which is generally supported by the core bridges 812 and 816 in the TRILL network 800, but not the edge bridges 810 and 818. The Ethernet header 908 includes a MAC address for a next bridge in the network 800 that is on a path from the bridge node 812 to the egress bridge node 818—that is, bridge 816.

In the example of FIG. 8, the bridge node 812 uses the forwarding tables 1005 established in accordance with the TRILL specification to identify the next bridge in the network 800 that is on the shortest path from the ingress bridge node 810 to the egress bridge node 818. Each bridge has a set of forwarding tables customized for that bridge's location in the topology of the network 800 for routing frames between different pairs of edge bridges. In this manner, the bridge node 812 can use the ingress bridge nickname 1004 and the egress bridge nickname 1006 to locate the next node along the path between any pair of ingress and egress nodes.

After the Ethernet header 908 is added to the frame 822*b*, then the bridge node 812 may route the frame 822*b* to the next bridge node using the MAC address 910 of that next node by placing the frame 822*b* in the transmission stack for the port 900*k* corresponding to MAC address 910. Once the frame 822 is placed in the transmission stack for a port 900*k*, the bridge interface, such as the bridge interface described with reference to FIG. 7, sends the frame 822 out from the appropriate port 900*k* to the next bridge—that is, bridge 816.

In the example of FIG. 8, even though bridge 812 receives the frame 822*a* from edge bridge 810 in the TRILL network 800, one of ordinary skill in the art will note that the received frame 822*a* does not already have a TRILL header or an additional MAC address for TRILL network equipment based on the TRILL header. In such a manner, the frame 822 does not utilize MAC-in-MAC encapsulation as the frame 822 traverse the first hop in the TRILL network 800. This allows the TRILL network 800 to use bridges with hardware that does not support MAC-in-MAC encapsulation as edge bridges. Because the current generation of bridges does not support MAC-in-MAC encapsulation, the ability to use existing bridges as edges bridges in a TRILL network reduces the financial costs of implementing a TRILL network solution.

When using bridges that do not support MAC-in-MAC encapsulation as edge bridges in a TRILL network, the MAC addresses for the bridges in the TRILL network and the supporting TRILL header must be stripped from the frame before the frame reaches the egress bridge node—namely, when the frame reaches bridge 816. For further explanation of the frame processing that takes place at core bridge 816, FIG. 9 sets forth a flow chart illustrating a further exemplary method of routing frames in a TRILL network 800 using service VLAN identifiers according to embodiments of the present invention.

The network topology of FIG. 9 is similar to the topology in FIG. 8. The TRILL network 800 of FIG. 9 includes a plurality of bridge nodes 810, 812, 816, 818. In FIG. 9, bridge node 810 operates as an ingress bridge node through which the frames are received into the TRILL network 800, and bridge node 818 operates as an egress bridge node through which the frames are transmitted out of the TRILL network 800. Each ingress bridge node and each egress bridge node is assigned a unique service VLAN identifier. The bridge nodes 812, 816 of FIG. 9 operate as core bridges. In the example of FIG. 9, the hardware of the ingress bridge node 810 and hardware of the egress bridge node 818 do not support MAC-in-MAC encapsulation, and thus are unable to support the TRILL protocol.

The bridge node 816 of FIG. 9 includes twelve ports 1100*a*-1 through which other nodes may connect to the bridge node 816. In the example of FIG. 9, the core bridge node 812 connects to the bridge node 816 through port 1100*c*. Egress bridge node 818 connects to the bridge node 816 through port 1100*i*.

The method of FIG. 9 includes receiving 1102, by bridge node 816, a frame 822 for transmission to a destination node 808. The destination node 808 of FIG. 9 connects to the network 800 through the egress bridge node 818 and customer network 805. The frame 822 specifies the source node address 826 of the source node originating the frame 822 and the destination node address 824 of the destination node 808. The frame 822 has a TRILL header 1003 that includes an ingress bridge nickname 1004 and an egress bridge nickname 1006. The frame 822 also includes an Ethernet header 908 that includes a MAC address 910 of the bridge node 816—all similar to those described above with reference to FIG. 8. The bridge node 816 may receive 1102 the frame 822*b* according to the method of FIG. 9 by retrieving the frame 822*d* from a reception stack for port 1100*c* and advancing the stack pointer for the reception stack. The reception stack may be implemented as a buffer into which frames received from a port 1100 are placed until those frames are processed by the bridge 816.

The method of FIG. 9 includes determining 1104, by the bridge node 816, that the frame 822 traverses the egress bridge node 816 on the next network hop. In the method of FIG. 9, the bridge node 816 may determine 1104 that the frame 822 traverses the egress bridge node 816 on the next network hop using network topology 1105, which may be obtained and implemented in a manner as will occur to those of skill in the art, particularly through a dynamic control protocol that periodically detects changes in the network topology.

As previously mentioned, egress bridge 818 does not support MAC-in-MAC encapsulation. Thus, the method of FIG. 9 includes replacing 1108, by the bridge node 816 in response to the determination, the TRILL header 1003 with the service VLAN identifier 831. Because the TRILL nicknames and the service VLAN identifiers may be implemented using the same values, the bridge node 816 may replace 1108 the TRILL header 1003 with service VLAN identifier 831 according to the method of FIG. 9 by removing the TRILL header 1003 and the Ethernet header 908 and adding a vender header 830 to the frame 822*c* that includes the value of the ingress bridge nickname 1004 as the service VLAN identifier 831. In some other embodiments in which the service VLAN identifiers for the edge bridges and the TRILL nicknames are not the same, then the bridge 816 may use a lookup table that associates service VLAN identifiers for edge nodes with their corresponding TRILL nicknames. The lookup table may be implemented in any manner as will occur to those of skill in the art and periodically updated using a network control protocol or other such mechanism as will occur to those of skill in the art.

The method of FIG. 9 includes routing 1110, by the bridge node 816, the frame 822 to the egress bridge node 816. The bridge node 816 may route 1110 the frame 822 to the egress bridge node 816 according to the method of FIG. 9 by storing the frame 822 in the transmission stack for the port 1100i corresponding the next bridge 818. Once the frame 822 is placed in the transmission stack for a port 1100i, the bridge interface, such as the bridge interface described with reference to FIG. 7, sends the frame 822 out from the appropriate port 1100i to the egress bridge 818.

One of ordinary skill in the art will recall from above that the service VLAN identifier 831 is part of a customized or stacked vender header that does not conform with IEEE 802.1Q. Because the customer network of FIG. 8 is a IEEE 802.1Q compliant network, the egress bridge node 818 removes the vender header 830 from the frame 822 before sending the frame 822 to the destination node 808.

By removing the TRILL header 1003 and the additional MAC address 910 for TRILL network equipment that is based on the TRILL header, the frame 822 is essentially transformed from a TRILL frame with MAC-in-MAC encapsulation into a frame with stack headers that does not utilize MAC-in-MAC encapsulation, typically an IEEE802.1ad compliant frame. This allows the TRILL network 800 to use bridges with hardware that does not support MAC-in-MAC encapsulation as edge bridges. Because the current generation of bridges does not support MAC-in-MAC encapsulation, the ability to use existing bridges as edges bridges in a TRILL network reduces the financial costs of implementing a TRILL network solution.

When egress bridge 818 receives the frame 822, egress bridge 818 records the ingress node identifier (Customer VLAN ID 823)-origin node address (Source Address 826) pair. Recording this value pair allows egress bridge 818 to learn that the origin node (not shown) is connected to the network 800 through edge bridge 810 and utilize the information in the future when egress bridge 818 operates as an ingress bridge node. Egress bridge 818 utilizes such information as an ingress bridge node because edge bridge 818 needs to know which edge bridge is the egress bridge node to determine the shortest path through the network 800.

Exemplary embodiments of the present invention are described largely in the context of a fully functional network bridges configured for routing frames in a TRILL network using service VLAN identifiers. One of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of routing frames in a Transparent Interconnection of Lots of Links ('TRILL') network using service virtual local area network ('VLAN') identifiers, the TRILL network including a plurality of bridge nodes, at least one of the plurality of bridge nodes operating as an ingress bridge node through which the frames are received into the TRILL network, and at least one of the plurality of bridge nodes operating as an egress bridge node through which the frames are transmitted out of the TRILL network, at least one ingress bridge node and at least one egress bridge node assigned a unique service VLAN identifier, the method comprising the steps of:

receiving, by one of the plurality of bridge nodes from the ingress bridge node, a frame for transmission to a destination node, the destination node connected to the TRILL network through the egress bridge node, the received frame including a customer VLAN identifier, a service VLAN identifier for the ingress bridge node, and a destination node address for the destination node, the received frame not having mac-in-mac encapsulation;

adding, by the one bridge node to the received frame in dependence upon the service VLAN identifier for the ingress bridge node and the destination node address for the destination node, a TRILL header conforming to the TRILL protocol, the TRILL header including an ingress bridge nickname and an egress bridge nickname; and routing, by the one bridge node to the egress bridge node through which the destination node connects to the network, the received frame in dependence upon the ingress bridge nickname and the egress bridge nickname.

2. The method of claim 1 wherein the received frame further comprises a vender header specified by a vender of the ingress bridge node, the vender header including the service VLAN identifier.

3. The method of claim 1 wherein the step of routing the received frame further comprises the steps of:

encapsulating the received frame with an Ethernet header in dependence upon the ingress bridge nickname and the egress bridge nickname, the Ethernet header including a media access control ('MAC') address for a next bridge in the TRILL network that is on a path from the one bridge node to the egress bridge node; and routing the received frame to the next bridge node in dependence upon the MAC address.

4. The method of claim 1 further comprising the step of adding, by the ingress bridge node, the service VLAN identifier for the ingress bridge node to the received frame.

5. The method of claim 1 wherein hardware of the ingress bridge node and hardware of the egress bridge node are incapable of mac-in-mac encapsulation.

6. The method of claim 1 wherein the service VLAN identifier conforms to the Institute of Electrical and Electronics Engineers ('IEEE') 802.1ad standard.

7. A method of routing frames in a Transparent Interconnection of Lots of Links ('TRILL') network using service virtual local area network ('VLAN') identifiers, the TRILL network including a plurality of bridge nodes, at least one of the plurality of bridge nodes operating as an ingress bridge node through which the frames are received into the TRILL network, and at least one of the plurality of bridge nodes operating as an egress bridge node through which the frames are transmitted out of the TRILL network, at least one ingress bridge node and at least one egress bridge node assigned a unique service VLAN identifier, the method comprising the steps of:

receiving, by one of the plurality of bridge nodes connected to the egress bridge node by a single hop, a frame for transmission to a destination node, the destination node connected to the network through the egress bridge node, the received frame originating from a source node connected to the network through the ingress bridge node, the received frame including a destination node address for the destination node and a TRILL header, the TRILL header including an ingress bridge nickname for the ingress bridge node and an egress bridge nickname for the egress bridge node;

determining, by the one bridge node, that the received frame traverses the egress bridge node on the next hop toward the destination node;

replacing, by the one bridge node in response to the determination, the TRILL header with the service VLAN identifier for the ingress bridge node; and routing, by the one bridge node, the received frame to the egress bridge node.

8. The method of claim 7 wherein the step of replacing the TRILL header further comprises the step of replacing the TRILL header with a vender header specified by a vender of the egress bridge node, the vender header including the service VLAN identifier.

9. The method of claim 7 wherein hardware of the ingress bridge node and hardware of the egress bridge node are incapable of mac-in-mac encapsulation.

10. The method of claim 7 wherein the service VLAN identifier conforms to the Institute of Electrical and Electronics Engineers ('IEEE') 802.1ad standard.

11. A method of routing frames in a Transparent Interconnection of Lots of Links ('TRILL') network using service virtual local area network ('VLAN') identifiers, the TRILL network including a plurality of bridge nodes, at least one of the plurality of bridge nodes operating as an ingress bridge node through which the frames are received into the TRILL network, and at least one of the plurality of bridge nodes operating as an egress bridge node through which the frames are transmitted out of the TRILL network, at least one ingress bridge node and at least one egress bridge node assigned a unique service VLAN identifier, the method comprising the steps of:

receiving, by one of the plurality of bridge nodes from the ingress bridge node, a frame for transmission to a destination node, the destination node connected to the TRILL network through the egress bridge node, the received frame including a customer VLAN identifier, a service VLAN identifier for the egress bridge node, and a destination node address for the destination node, the received frame not having mac-in-mac encapsulation;

adding, by the one bridge node to the received frame in dependence upon the service VLAN identifier for the egress bridge node and a port on which the one bridge node received the received frame, a TRILL header conforming to the TRILL protocol, the TRILL header including an ingress bridge nickname and an egress bridge nickname, the port associated with the ingress bridge nickname, the service VLAN identifier for the egress bridge node associated with the egress bridge nickname; and routing, by the one bridge node to the egress bridge node through which the destination node connects to the network, the received frame in dependence upon the TRILL header.

12. An apparatus for routing frames in a Transparent Interconnection of Lots of Links ('TRILL') network using service virtual local area network ('VLAN') identifiers, the TRILL network including a plurality of bridge nodes, the apparatus operating as one of the plurality of bridge nodes, at least one of the plurality of bridge nodes operating as an ingress bridge node through which the frames are received into the TRILL network, and at least one of the plurality of bridge nodes operating as an egress bridge node through which the frames are transmitted out of the TRILL network, at least one ingress bridge node and at least one egress bridge node assigned a unique service VLAN identifier, the apparatus comprising:

a computer memory storing a computer program, the computer program comprising instructions when executed cause the apparatus to:

receive, from the ingress bridge node, a frame for transmission to a destination node, the destination node connected to the TRILL network through the egress bridge node, the received frame including a customer VLAN identifier, a service VLAN identifier for the ingress bridge node, and a destination node address for the destination node, the received frame not having mac-in-mac encapsulation, add, to the received frame in dependence upon the service VLAN identifier for the ingress bridge node and the destination node address for the destination node, a TRILL header conforming to the TRILL protocol, the TRILL header including an ingress bridge nickname and an egress bridge nickname, and route, to the egress bridge node through which the destination node connects to the network, the received frame in dependence upon the ingress bridge nickname and the egress bridge nickname; and a processor that is operatively coupled to the computer memory and executes the instructions.

13. The apparatus of claim 12 wherein the received frame further comprises a vender header specified by a vender of the ingress bridge node, the vender header including the service VLAN identifier.

14. The apparatus of claim 12 wherein the instructions that when executed cause the apparatus to route the received frame further comprise additional instructions that when executed cause the apparatus to:

encapsulate the received frame with an Ethernet header in dependence upon the ingress bridge nickname and the egress bridge nickname, the Ethernet header including a media access control ('MAC') address for a next bridge in the TRILL network that is on a path from the one bridge node to the egress bridge node; and route the received frame to the next bridge node in dependence upon the MAC address.

15. The apparatus of claim 12 wherein the ingress bridge node adds the service VLAN identifier for the ingress bridge node to the received frame.

16. The apparatus of claim 12 wherein hardware of the ingress bridge node and hardware of the egress bridge node are incapable of mac-in-mac encapsulation.

17. The apparatus of claim 12 wherein the service VLAN identifier conforms to the Institute of Electrical and Electronics Engineers ('IEEE') 802.1ad standard.

18. An apparatus for routing frames in a Transparent Interconnection of Lots of Links ('TRILL') network using service virtual local area network ('VLAN') identifiers, the TRILL network including a plurality of bridge nodes, at least one of the plurality of bridge nodes operating as an ingress bridge node through which the frames are received into the TRILL network, and at least one of the plurality of bridge nodes operating as an egress bridge node through which the frames are transmitted out of the TRILL network, at least one ingress bridge node and at least one egress bridge node assigned a unique service VLAN identifier, the apparatus operating as one of the plurality of bridge nodes connected to the egress bridge node by a single network hop, the apparatus comprising:

a computer memory storing a computer program, the computer program comprising instructions that when executed cause the apparatus to:

receive a frame for transmission to a destination node, the destination node connected to the network through the egress bridge node, the received frame originating from a source node connected to the network through the ingress bridge node, the received frame including a destination node address for the destination node and a TRILL header, the TRILL header including an ingress bridge nickname for the ingress bridge node and an egress bridge nickname for the egress bridge node, determine that the received frame traverses the egress bridge node on the next hop toward the destination node, replace, in response to the determination, the TRILL header with the service VLAN identifier for the ingress bridge node, and route the received frame to the egress bridge node; and a processor that is operatively coupled to the computer memory and executes the instructions.

19. The apparatus of claim 18 wherein the instructions that when executed cause the apparatus to replace the TRILL header further comprise additional instructions that replace the TRILL header with a vender header specified by a vender of the egress bridge node, the vender header including the service VLAN identifier.

20. The apparatus of claim 18 wherein hardware of the ingress bridge node and hardware of the egress bridge node are incapable of mac-in-mac encapsulation.

21. The apparatus of claim 18 wherein the service VLAN identifier conforms to the Institute of Electrical and Electronics Engineers ('IEEE') 802.1ad standard.

22. A Non-transitory computer-readable medium for routing frames in a Transparent Interconnection of Lots of Links ('TRILL') network using service virtual local area network ('VLAN') identifiers, the TRILL network including a plurality of bridge nodes, at least one of the plurality of bridge nodes operating as an ingress bridge node through which the frames are received into the TRILL network, and at least one of the plurality of bridge nodes operating as an egress bridge node through which the frames are transmitted out of the TRILL network, at least one ingress bridge node and at least one egress bridge node assigned a unique service VLAN identifier, the computer-readable medium encoded with instructions that are executed by a processor in a data processing system to perform the steps of:

receiving, by one of the plurality of bridge nodes from the ingress bridge node, a frame for transmission to a destination node, the destination node connected to the TRILL network through the egress bridge node, the received frame including a customer VLAN identifier, a service VLAN identifier for the ingress bridge node, and a destination node address for the destination node, the received frame not having mac-in-mac encapsulation;

adding, by the one bridge node to the received frame in dependence upon the service VLAN identifier for the ingress bridge node and the destination node address for the destination node, a TRILL header conforming to the TRILL protocol, the TRILL header including an ingress bridge nickname and an egress bridge nickname; and routing, by the one bridge node to the egress bridge node through which the destination node connects to the network, the received frame in dependence upon the ingress bridge nickname and the egress bridge nickname.

23. The Non-transitory computer-readable medium of claim 22 wherein the received frame further comprises a vender header specified by a vender of the ingress bridge node, the vender header including the service VLAN identifier.

24. The Non-transitory computer-readable medium of claim 22 wherein the step of routing the received frame further comprises the steps of:

encapsulating the received frame with an Ethernet header in dependence upon the ingress bridge nickname and the egress bridge nickname, the Ethernet header including a media access control ('MAC') address for a next bridge in the TRILL network that is on a path from the one bridge node to the egress bridge node; and routing the received frame to the next bridge node in dependence upon the MAC address.

25. The Non-transitory computer-readable medium of claim 22 wherein the method further comprises the step of adding, by the ingress bridge node, the service VLAN identifier for the ingress bridge node to the received frame.

26. The Non-transitory computer-readable medium of claim 22 wherein hardware of the ingress bridge node and hardware of the egress bridge node are incapable of mac-in-mac encapsulation.

27. The Non-transitory computer-readable medium of claim 22 wherein the service VLAN identifier conforms to the Institute of Electrical and Electronics Engineers ('IEEE') 802.1ad standard.

28. A Non-transitory computer-readable medium for routing frames in a Transparent Interconnection of Lots of Links ('TRILL') network using service virtual local area network ('VLAN') identifiers, the TRILL network including a plurality of bridge nodes, at least one of the plurality of bridge nodes operating as an ingress bridge node through which the frames are received into the TRILL network, and at least one of the plurality of bridge nodes operating as an egress bridge node through which the frames are transmitted out of the TRILL network, at least one ingress bridge node and at least one egress bridge node assigned a unique service VLAN identifier, the computer-readable medium encoded with instructions that are executed by a processor in a data processing system to perform the steps of:

receiving, by one of the plurality of bridge nodes connected to the egress bridge node by a single hop, a frame for transmission to a destination node, the destination node connected to the network through the egress bridge node, the received frame originating from a source node connected to the network through the ingress bridge node, the received frame including a destination node address for the destination node and a TRILL header, the TRILL header including an ingress bridge nickname for the ingress bridge node and an egress bridge nickname for the egress bridge node;

determining, by the one bridge node, that the received frame traverses the egress bridge node on the next hop toward the destination node;

replacing, by the one bridge node in response to the determination, the TRILL header with the service VLAN identifier for the ingress bridge node; and routing, by the one bridge node, the received frame to the egress bridge node.

29. The Non-transitory computer-readable medium of claim 28 wherein the step of replacing the TRILL header further comprises the step of replacing the TRILL header with a vender header specified by a vender of the egress bridge node, the vender header including the service VLAN identifier.

30. The Non-transitory computer-readable medium of claim 28 wherein hardware of the ingress bridge node and hardware of the egress bridge node are not capable of mac-in-mac encapsulation.

31. The Non-transitory computer-readable medium of claim 28 wherein the service VLAN identifier conforms to the Institute of Electrical and Electronics Engineers ('IEEE') 802.1ad standard.

* * * * *